US009137437B2

(12) United States Patent
Choi et al.

(10) Patent No.: US 9,137,437 B2
(45) Date of Patent: Sep. 15, 2015

(54) METHOD FOR CHANGING DISPLAYED CHARACTERISTICS OF A PREVIEW IMAGE

(71) Applicant: LG ELECTRONICS INC., Seoul (KR)

(72) Inventors: Manrok Choi, Seoul (KR); Changmook Lim, Seoul (KR); Seongil Lee, Seoul (KR); Sungsu Lee, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 13/774,998

(22) Filed: Feb. 22, 2013

(65) Prior Publication Data

US 2014/0063313 A1 Mar. 6, 2014

(30) Foreign Application Priority Data

Sep. 3, 2012 (KR) ........................ 10-2012-0097280

(51) Int. Cl.
*H04N 5/222* (2006.01)
*H04N 5/232* (2006.01)
*G06F 3/0484* (2013.01)
*G06F 3/0488* (2013.01)
*H04N 5/44* (2011.01)
*G06F 3/01* (2006.01)

(52) U.S. Cl.
CPC .......... *H04N 5/23216* (2013.01); *G06F 3/0488* (2013.01); *G06F 3/04847* (2013.01); *H04N 5/23293* (2013.01); *G06F 3/016* (2013.01); *H04N 2005/443* (2013.01)

(58) Field of Classification Search
CPC ................................. H04N 5/23216
USPC ............ 348/231.6, 333.02, 333.12, 345, 349; 345/173
See application file for complete search history.

(56) References Cited

U.S. PATENT DOCUMENTS

| 5,923,908 | A  | * | 7/1999 | Schrock et al. ................. 396/85 |
| 2010/0020221 | A1 | * | 1/2010 | Tupman et al. ........... 348/333.01 |
| 2010/0208107 | A1 | * | 8/2010 | Nonaka et al. ........... 348/240.99 |
| 2011/0063491 | A1 | * | 3/2011 | Kim et al. ................. 348/333.01 |
| 2013/0044341 | A1 | * | 2/2013 | Uchino ........................ 358/1.13 |

FOREIGN PATENT DOCUMENTS

| EP | 2000894 | 12/2008 |
| EP | 2169946 | 3/2010 |

(Continued)

OTHER PUBLICATIONS

Korean Intellectual Property Office Application Serial No. 10-2012-0097280, Notice of Allowance dated Nov. 21, 2013, 2 pages.

(Continued)

*Primary Examiner* — Twyler Haskins
*Assistant Examiner* — Akshay Trehan
(74) *Attorney, Agent, or Firm* — Lee, Hong, Degerman, Kang & Waimey

(57) ABSTRACT

Disposed are a mobile device capable of capturing images, and a method for controlling the same. The method for controlling a mobile device includes: sensing an image using a camera, and displaying, on a display unit, a virtual button for inputting a capturing command with respect to the sensed image; activating a prescribed function when a first touch is input to the display unit, the first touch starting from a point spaced from the virtual button and reaching the virtual button; and controlling the prescribed function using a second touch consecutive with the first touch, and executing the capturing command when the second touch is released.

30 Claims, 23 Drawing Sheets

(56) References Cited

FOREIGN PATENT DOCUMENTS

| | | | | | |
|---|---|---|---|---|---|
| EP | 2405299 | * | 6/2011 | ............ | G03B 17/40 |
| EP | 2405299 | | 1/2012 | | |
| JP | 2008191799 | | 8/2008 | | |
| JP | 5185150 | * | 8/2010 | ............ | G03B 17/18 |
| JP | 2010182023 | | 8/2010 | | |
| KR | 100896711 | | 5/2009 | | |
| KR | 101126867 | | 3/2012 | | |

OTHER PUBLICATIONS

European Patent Office Application Serial No. 13001981.3, Search Report dated Nov. 29, 2013, 7 pages.

* cited by examiner

METHOD FOR CHANGING DISPLAYED CHARACTERISTICS OF A PREVIEW IMAGE

CROSS-REFERENCE TO RELATED APPLICATION

Pursuant to 35 U.S.C. §119(a), this application claims the benefit of earlier filing date and right of priority to Korean Application No. 10-2012-0097280, filed on Sep. 3, 2012, the contents of which is incorporated by reference herein in its entirety.

BACKGROUND OF THE INVENTION

1. Field of the Invention

The present disclosure relates to a mobile device and a control method for the same, and particularly, to a mobile device capable of capturing images and performing functions related to image capturing, and a control method for the same.

2. Background of the Invention

A mobile device is a device that can be carried around and has one or more functions such as to perform voice and video call communications, inputting and outputting information, storing data, and the like.

Recently, as functions of the mobile device become more diversified, the mobile device can support more complicated functions such as capturing images or video, reproducing music or video files, playing games, receiving broadcast signals, and the like. By comprehensively and collectively implementing such functions, the mobile device may be embodied in the form of a multimedia player or a device.

Various attempts have been made to implement complicated functions in such a multimedia device by means of hardware or software. Efforts for improving the structural and/or software part of the mobile device have been made in order to support and develop these functions of the mobile device.

In regard to such software improvements, may be proposed improving functions related to image capturing. Especially, since a user captures images while viewing a preview with holding the mobile device, there is a limitation in the user's finger which applies an input for execution of a prescribed function.

SUMMARY OF THE INVENTION

Therefore, an aspect of the detailed description is to provide a mobile device capable of allowing a user to more conveniently input a control command in a camera mode, and a method for controlling the same.

Another aspect of the detailed description is to provide a mobile device capable of simultaneously performing a prescribed function and capturing images through consecutive inputs, and a method for controlling the same.

To achieve these and other advantages and in accordance with the purpose of this specification, as embodied and broadly described herein, there is provided a method for controlling a mobile device, the method comprising: sensing an image using a camera, and displaying, on a display unit, a virtual button for inputting a capturing command with respect to the sensed image; activating a prescribed function when a first touch is input to the display unit, the first touch starting from a point spaced from the virtual button and reaching the virtual button; and controlling the prescribed function using a second touch consecutive with the first touch, and executing the capturing command when the second touch is released.

In another embodiment, in the step of activating a prescribed function, different functions may be activated according to a direction of the first touch towards the virtual button. The prescribed function may include at least one of a zoom function, a brightness control function, and a menu selection function in a capturing mode.

In another embodiment, an icon corresponding to the prescribed function may be output to the display unit. Once the icon is touched, the prescribed function may change into other function. If the prescribed function changes into said other function, the icon may change into an icon corresponding to said other function.

In another embodiment, a slide bar may be output to at least one side of the virtual button. Once the slide bar is dragged towards the virtual button, the prescribed function may be activated. If the prescribed function is activated, at least one function may be performed, among disappearing the slide bar such that a preview region is enlarged on the display unit, and changing the virtual button to be transparent.

In another embodiment, once the prescribed function is activated, at least part of the virtual button may change such that the prescribed function is displayed. A camera image may be output into the virtual button, and the camera image may change into another image while the prescribed function is being activated.

In another embodiment, the second touch may be a touch input which rotates around the virtual button on one surface of the display unit. A controller of the mobile device may execute the prescribed function based on the degree of the rotation.

The second touch may be a drag which moves from the virtual button with drawing a rotation track. The prescribed function may be controlled according to the length of the rotation track, and the capturing command may be executed when the drag is released from the end of the rotation track.

The second touch may be a rotation touch which rotates at the same spot around the virtual button, and the prescribed function may be controlled according to a rotation angle of the rotation touch.

In another embodiment, the second touch may include a first drag input to one direction starting from the virtual button, and a second drag input to another direction perpendicular to said one direction. The first and second drags may be configured to control different functions. The first drag may be configured to control a menu selection function, and the second drag may be configured to control a function of a menu selected by the first drag.

In another embodiment, the method may further comprise generating a control range of the prescribed function towards two sides based on the virtual button. The second touch may be a drag input within the control range, and the capturing command may be executed by a drag or flicking input to a direction perpendicular to a drag direction of the second touch.

In another embodiment, the method may further comprise locking the virtual button for prevention of execution of a capturing command, the execution due to touch of the virtual button while the prescribed function is being executed.

To achieve these and other advantages and in accordance with the purpose of this specification, as embodied and broadly described herein, there is also provided a mobile device, comprising: a camera configured to input images in a camera mode; a display unit configured to sense a touch input, and to output a capturing button with respect to the input images; and a controller configured to capture the input images using a touch input to the capturing button, wherein the controller is configured to execute a function related to the camera mode, using a first touch defined to be different from the touch and input to the capturing button, and is configured to lock the capturing button for prevention of capturing while the function is being executed.

In another embodiment, the controller may perform the control method comprising: sensing an image using the camera, and displaying the capturing button on the display unit; activating a prescribed function when the first touch is input to the display unit; and locking the capturing button for prevention of execution of a capturing command, the execution due to touch of the capturing button while the prescribed function is being executed. The control method performed by the controller may further comprise controlling the prescribed function using a second touch different from the first touch, and executing the capturing command when the second touch is released.

In another embodiment, the controller may activate different functions according to a direction of the first touch towards the capturing button.

In another embodiment, the capturing button may be moved by the second touch different from the first touch. The first touch may be a long touch input to the capturing button, and the second touch may be a drag for moving the capturing button. Once the drag is released, capturing may be executed, or the capturing button may change to be transparent.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. The suffixes attached to components of the wireless speaker, such as 'module' and 'unit or portion' were used for facilitation of the detailed description of the present invention. Therefore, the suffixes do not have different meanings from each other. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A mobile device of the present invention may be implemented in various types. For instance, the mobile device in the present description includes a portable phone, a smart phone, a notebook computer, a digital broadcasting device, Personal Digital Assistants (PDA), Portable Multimedia Player (PMP), a navigation system. However, it will be obvious to those skilled in the art that the present invention may be also applicable to a fixed device such as a digital TV and a desktop computer except for specific configurations for mobility.

Figure 1:
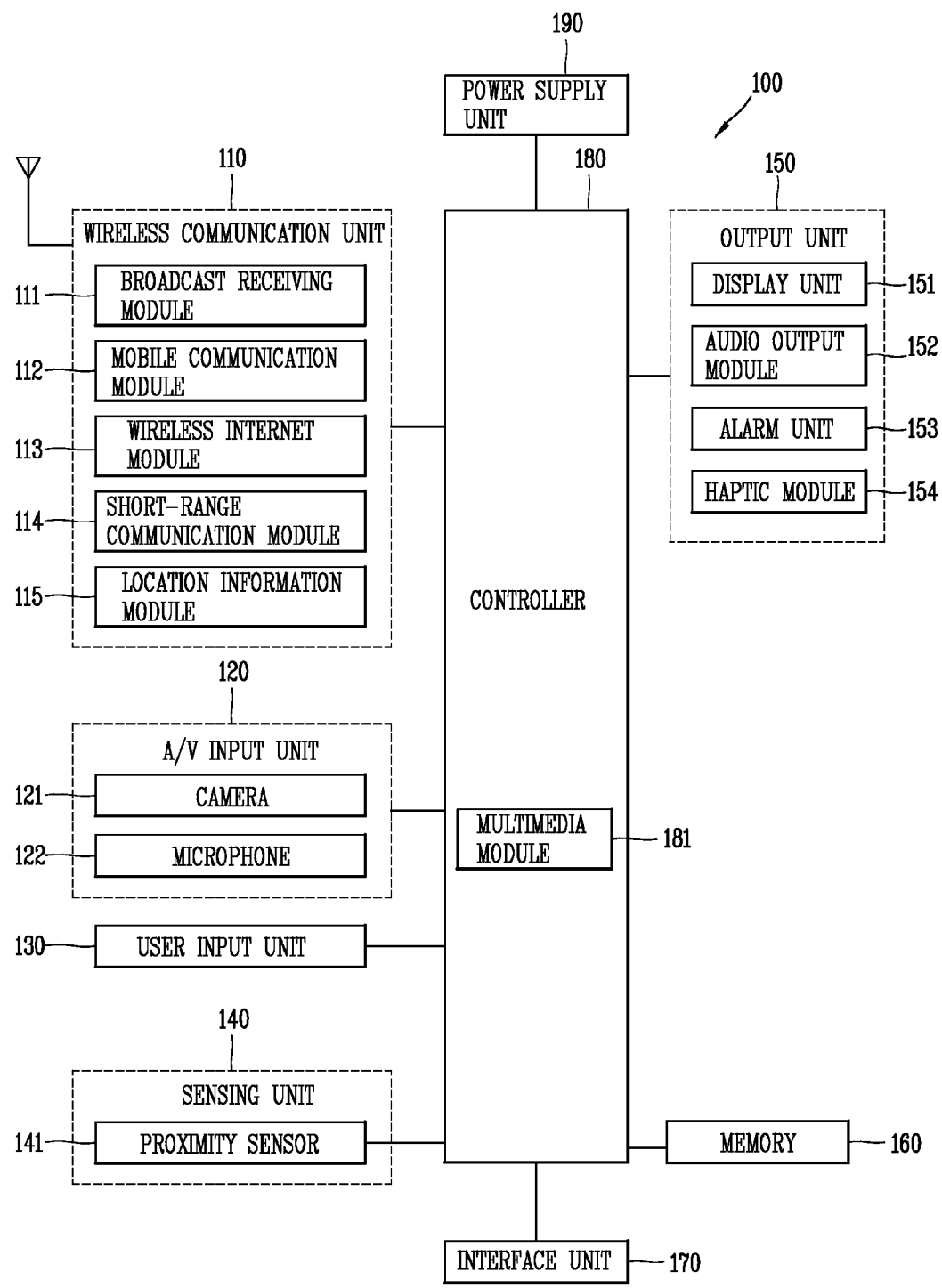
FIG. 1 is a block diagram showing a mobile device according to an embodiment of the present invention.

FIG. 1 is a block diagram of a mobile device 100 according to an embodiment of the present invention.

As shown in FIG. 1, the mobile device 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile device 100 having various components, but it is understood that implementing all of the illustrated components is not a requirement. The mobile device 100 may be implemented by greater or fewer components.

Hereinafter, each of the above components will be explained.

The wireless communication unit 110 typically includes one or more components allowing radio communication between the mobile device 100 and a wireless communication system or a network in which the mobile device is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a device. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external device and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data and image data.

The wireless Internet module 113 supports wireless Internet access for the mobile communication device. This module may be internally or externally coupled to the mobile device 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used. The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication device. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication device.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication device. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. The sensing unit 140 detects a current status (or state) of the mobile device 100 such as an opened or closed state of the mobile device 100, a location of the mobile device 100, the presence or absence of a user's touch (contact) with the mobile device 100 (e.g., touch inputs), the orientation of the mobile device 100, an acceleration or deceleration movement and direction of the mobile device 100, etc., and generates commands or signals for controlling the operation of the mobile device 100. For example, when the mobile device 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile device 100. For example, when the mobile device 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The rear surface of the display unit 151 may be transmissive. Under such configuration, a user can see an object located at rear side of the body through the display unit 151 of the body.

The display unit 151 may be implemented in two or more in number according to a configured aspect of the mobile device 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile device covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile device 100. The audio output module 152 may include a receiver, a speaker, a buzzer, etc.

The alarm unit 153 outputs a signal for informing about an occurrence of an event of the mobile device 100. Events generated in the mobile device may include call signal reception, message reception, key signal inputs, touch inputs, and the like. The alarm unit 153 may output not only video or audio signals, but also other types of signals such as signals notifying occurrence of events in a vibration manner. Here, the video signal or audio signal may be outputted through the display unit 151 or the audio output module 152. Accordingly, the display unit 151 or the audio output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile device 100.

The memory 160 may store software programs used for the processing and controlling operations performed by the controller 180, or may temporarily store data (e.g., a map data, phonebook, messages, still images, video, etc.) that are inputted or outputted. Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile device 100 may operate a web storage which performs the storage function of the memory 160 on the Internet.

The interface unit 170 may generally be implemented to interface the mobile device with external devices. The interface unit 170 may allow a data reception from an external device, a power delivery to each component in the mobile device 100, or a data transmission from the mobile device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile device 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile device 100 via a port.

Also, the interface unit 170 may serve as a path for power to be supplied from an external cradle to the mobile device 100 when the mobile device 100 is connected to the external cradle or as a path for transferring various command signals inputted from the cradle by a user to the mobile device 100. Such various command signals or power inputted from the cradle may operate as signals for recognizing that the mobile device 100 has accurately been mounted to the cradle.

The controller 180 typically controls the overall operations of the mobile device 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

Once a preset condition of the mobile device is satisfied, the controlled 180 can execute a locked state for limiting a user's input of control commands with respect to applications. And, the controller 180 can control a locked screen displayed in the locked state, based on a touch input sensed by the display unit (hereinafter, will be referred to as 'touch screen' 151) in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, will be explained a structure of a mobile device having the aforementioned components of FIG. 1. Hereinafter, the mobile device will be explained based on a mobile terminal such as a mobile phone or a smart phone. However, the mobile device may be applied to various types of mobile devices such as a tablet or a notebook.

Figure 2A:
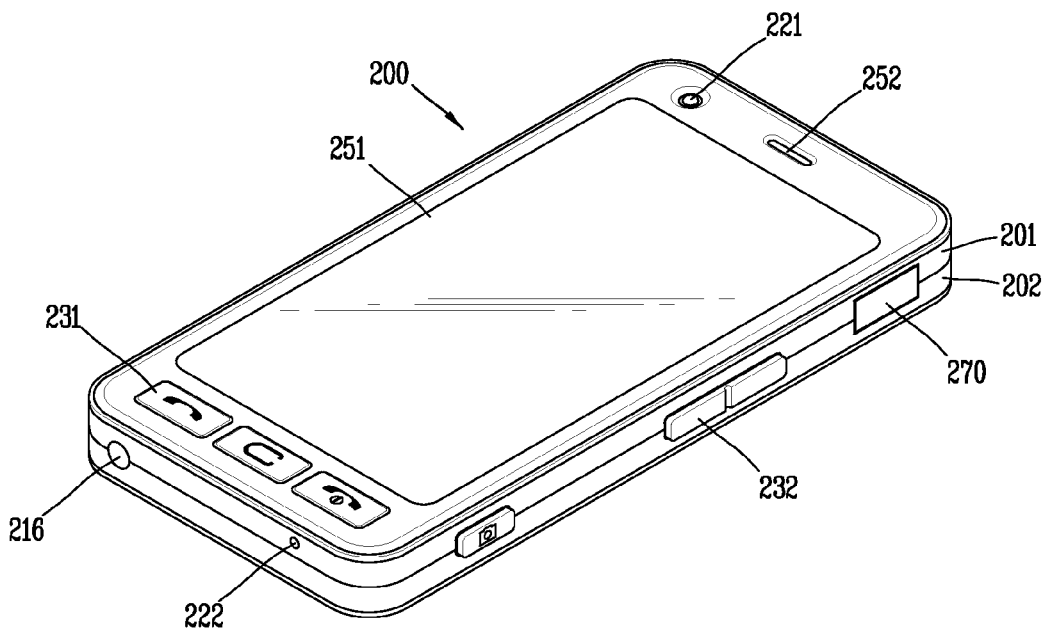
FIG. 2A is a front perspective view of a mobile device according to an embodiment of the present invention.
Figure 2B:
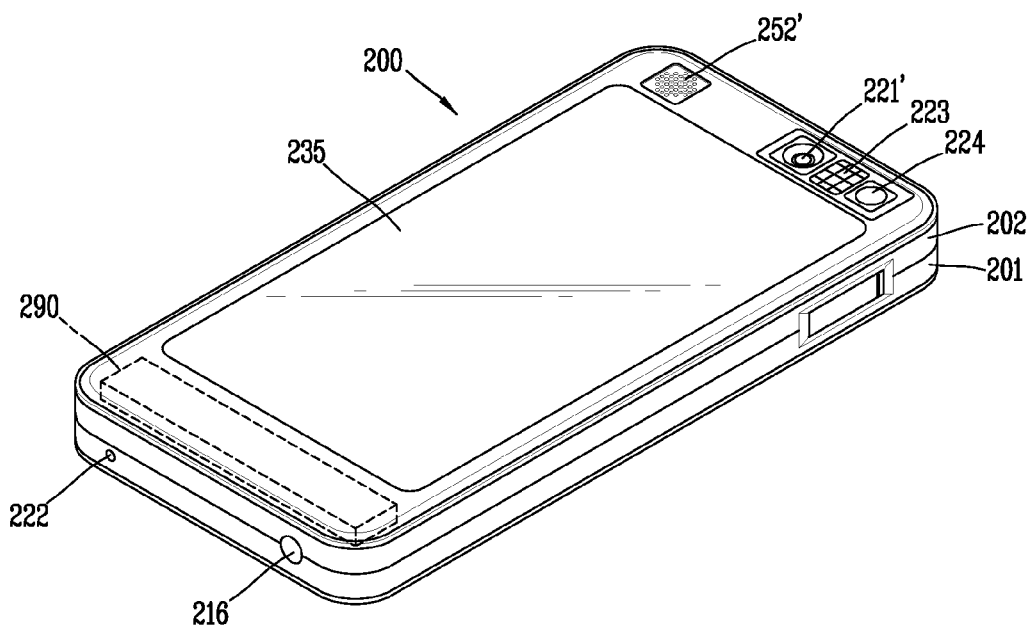
FIGS. 2B and 2C are rear perspective view of a mobile device according to an embodiment of the present invention.
Figure 2C:
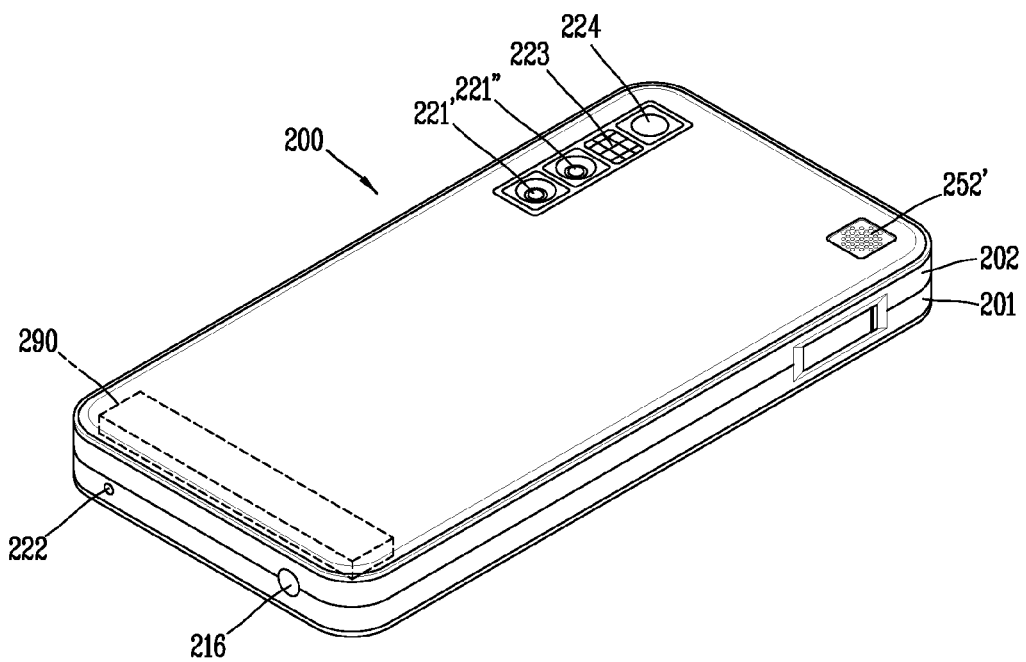

FIG. 2A is a front perspective view of a mobile device according to an exemplary embodiment, FIG. 2B is a rear perspective view of the mobile device of FIG. 2A, and FIG. 2C is a rear perspective view showing a modification example of the mobile device of FIG. 2B.

The mobile device according to the present invention is described as a bar type mobile device. However, the present invention is not limited to this, but may be applied to a slide type in which two or more bodies are coupled to each other so as to perform a relative motion, a folder type, or a swing type, a swivel type and the like.

A terminal body 200 (hereinafter, will be referred to as a 'body') includes a front surface, a rear surface and side surfaces. And, the body 200 includes two ends in a lengthwise direction.

The terminal body 200 includes a case (casing, housing, cover, etc.) which forms the appearance of the terminal body 200. The case may include a front case 201 and a rear case 202. A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

On the front case 201 of the terminal body 200, may be disposed a display unit 251, an audio output unit 252, a camera 221, user input units 231, 232, a microphone 222, an interface unit 270, etc.

The display unit 251 occupies most parts of a main surface of the front case 201. The audio output unit 252 and the camera 221 are arranged at a region adjacent to one end of the display unit 251, and the user input unit 231 and the microphone 222 are arranged at a region adjacent to another end of the display unit 251. The user input unit 231, the interface unit 270, etc. may be arranged on the side surfaces of the front case 201 and the rear case 202. The microphone 222 is disposed at another end of the terminal body 200.

The user input unit is manipulated to receive a command for controlling the operation of the mobile device, and may include a plurality of manipulation units 231 and 232. The manipulation units may be referred to as manipulating portions, and may include any type of ones that can be manipulated in a user's tactile manner.

Commands inputted through the first or second user input units 231 or 232 may be variously set. For instance, the first manipulation unit 231 is configured to input commands such as START, END, SCROLL or the like, and the second manipulation unit 232 is configured to input commands for controlling a level of sound outputted from the audio output unit 252, or commands for converting the current mode of the display unit 251 to a touch recognition mode.

Referring to FIG. 2B, an audio output unit 252' may be additionally disposed at the rear case 202. The audio output unit 252' may implement a stereo function together with the audio output unit 252 (refer to FIG. 2A), and may be used for calling in a speaker phone mode.

A power supply unit 290 for supplying power to the mobile device is mounted to the terminal body 200. The power supply unit 290 may be mounted in the terminal body, or may be detachably mounted to the terminal body.

A touch pad 235 for sensing touch may be additionally mounted to the rear case 202. Like the display unit 251, the touch pad 235 may be formed to be light-transmissive. In this case, if the display unit 251 is configured to output visual information from two surfaces thereof, the visual information can be recognized through the touch pad 235. The information output from the two surfaces can be controlled by the touch pad 235. Alternatively, a display may be additionally mounted to the touch pad 235, so that a touch screen can be disposed at the rear case 202.

A camera 221' may be additionally provided on the rear case 202. The camera 221' faces a direction which is opposite to a direction faced by the camera 221 (refer to FIG. 2A), and may have different pixels from those of the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it can be useful for a user to obtain higher quality pictures for later use. The cameras 221 and 221' may be installed at the terminal body 200 so as to rotate or pop-up.

A flash 223 and a mirror 224 may be additionally disposed close to the camera 221'. The flash 223 operates in conjunction with the camera 221' when taking a picture using the camera 221'. The mirror 224 can cooperate with the camera 121' to allow a user to photograph himself in a self-portrait mode.

In a case where the mobile device of the present invention can capture 3-dimensional (3D) images, a plurality of cameras (especially, a first camera 221' and a second camera 221") may be provided on one surface of the mobile device (refer to FIG. 2C).

The 3D images are implemented by using binocular disparity. As shown in FIG. 2C, 3D images can be captured by using the first camera 221' and the second camera 221".

A user's desired image can be captured by using all of the two cameras, even if 3D images are not captured by simultaneously using the first camera 221' and the second camera 221".

Referring to FIGS. 2B and 2C, an audio output unit 252' may be additionally arranged on the rear surface of the terminal body. The audio output unit 252' may cooperate with the audio output unit 252 (refer to FIG. 2A) so as to implement a stereo function. Also, the audio output unit 252' may be configured to operate as a speakerphone.

A power supply unit 290 for supplying power to the mobile device is mounted to the terminal body. The power supply unit 290 may be mounted in the terminal body, or may be detachably mounted to the terminal body.

The touch pad 235 operates in association with the display unit 251 of the front case 201. The touch pad 235 may be disposed on the rear surface of the display unit 251 in parallel. The touch pad 235 may have a size equal to or smaller than that of the display unit 251.

When the cameras 221 and 221' are in a capturing mode, images input through the cameras 221 and 221' are output to the display unit 251 of the mobile device including the above components according to the present invention. The controller 180 (refer to FIG. 1) may set a preview region on the display unit 251 based on a user's selection. The preview region is a region on the display unit 151 where a subject is displayed. Once a user inputs a capturing command, images output to the preview region are stored as still images or moving images.

The present invention provides a control method of a mobile device, capable of allowing a user to input a capturing command with more conveniently controlling images output to a preview region. Hereinafter, the control method will be explained in more detail.

Figure 3:
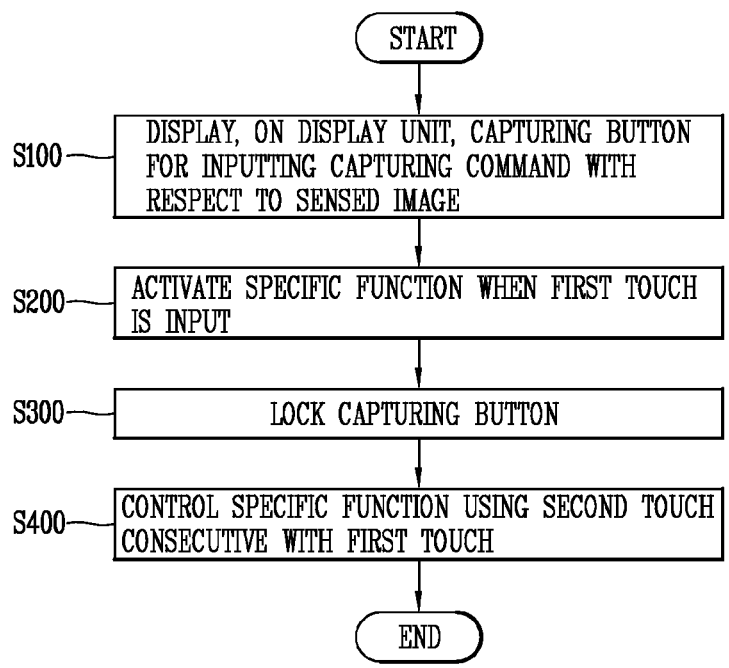
FIG. 3 is a flowchart showing a method for controlling a mobile device according to an embodiment of the present invention.
Figure 4A:
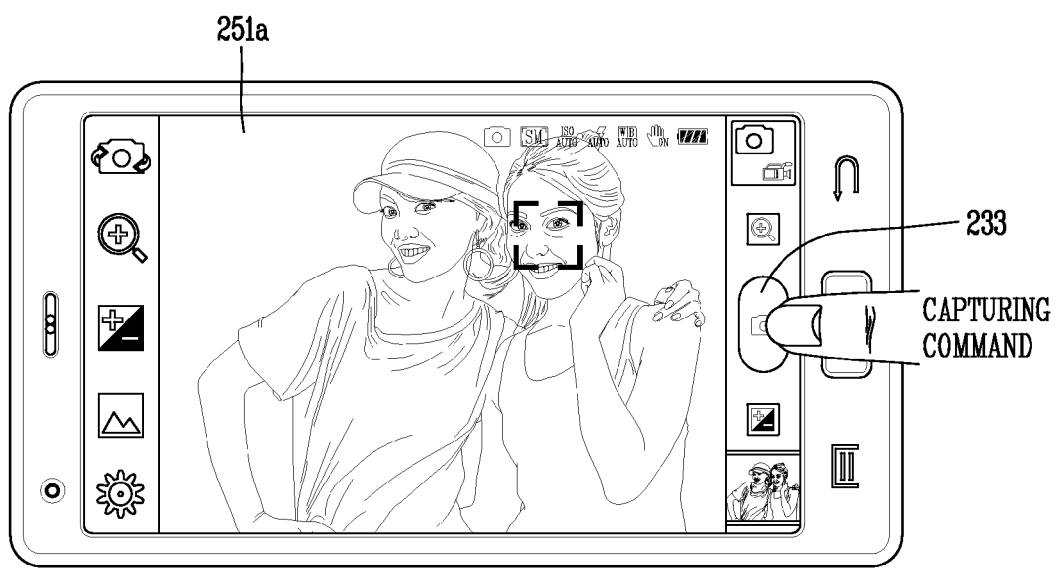
FIGS. 4A and 4B are conceptual views for explaining a method for controlling a mobile device according to an embodiment of the present invention.
Figure 4B:
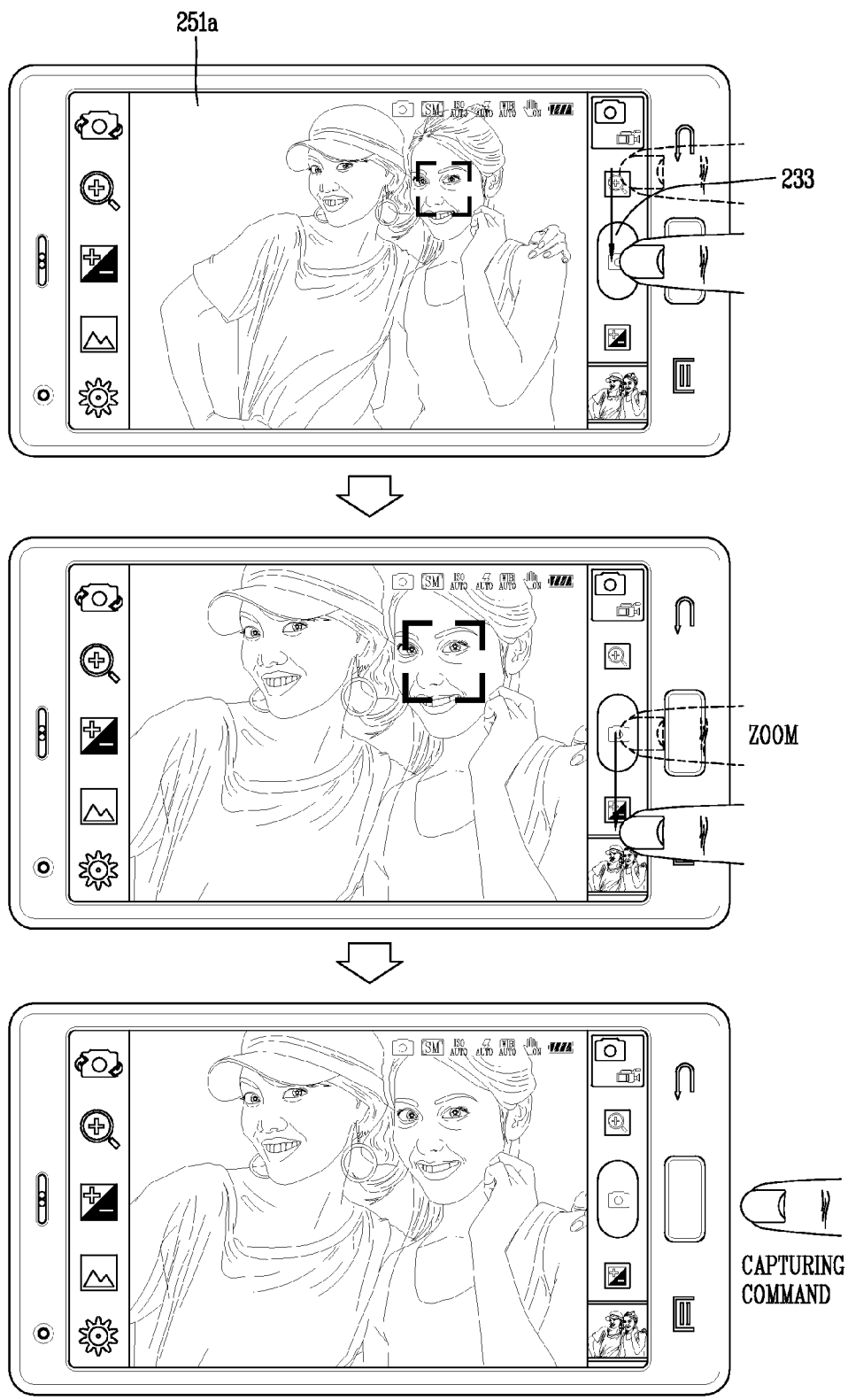

FIG. 3 is a flowchart showing a method for controlling a mobile device according to an embodiment of the present invention, and FIGS. 4A and 4B are conceptual views for explaining a method for controlling a mobile device according to an embodiment of the present invention.

Once the mobile device enters, by a user's selection, a camera mode where the camera 221 or 221' (refer to FIGS. 2A and 2B) is activated, images input through the camera 221 or 221' are output to the display unit 251. In this case, images are sensed by the camera, and a virtual button for inputting a capturing command with respect to the sensed images is displayed on the display unit (S100).

The mobile device of the present invention may be provided with a plurality of cameras 221 and 221'. In the capturing mode, one of the plurality of cameras may be activated, or the plurality of cameras may be simultaneously activated, according to a user's selection or setting by the controller 180.

Hereinafter, will be explained a method for capturing images by activating a single camera 221 or 221'. However, a mobile device capable of capturing three-dimensional (3D) images is provided with a plurality of cameras (generally two cameras) on one surface thereof. In this case, the plurality of cameras can be simultaneously activated.

Referring to FIG. 4A and 4B, the display unit 251 is provided with a preview region 251a for outputting a preview of sensed images. A virtual button 233 is output to one side of the preview region 251a.

The preview region 251a is a region where a subject input through the camera 221 or 221' is displayed. Here, the subject indicates an object to be captured, e.g., men or things.

The virtual button 233 is an icon configured to capture the subject when being touched, which may be a capturing button. Hereinafter, the virtual button is referred to as a capturing button.

Referring to FIG. 3 again, once a first touch is input, a prescribed function (or specific function) is activated (S200).

The prescribed function includes at least one of a zoom function, a brightness control function, and a menu selection function in a capturing mode. The first touch may be at least one of a short touch, a long touch (touch for a time duration more than a prescribed value), a drag and a flicking. In the drawings, there is shown a drag that the first touch starts from a point spaced from the capturing button on the display unit, and then reaches the capturing button.

Referring to FIG. 4A, if the user short-touches the capturing button 233 (touches for a time duration less than a prescribed value), images output to the preview region 251a are captured to be stored. However, as shown in FIG. 4B, if the user performs a drag towards the capturing button 233, the controller 180 does not store images, while activating a zoom function of the camera.

After the zoom function is activated, the drag may be an execution command for zoom-in and zoom-out. As shown in FIG. 4B, if a drag input for executing a zoom function reaches the capturing button, a zoom function is activated. If the drag input is consecutively performed after reaching the capturing button, a zoom-in function may be executed.

The user executes a zoom-in function through a drag consecutive to the drag input. If the drag is ended (or the user's finger is detached from the display unit), images zoom-controlled on the preview region 251a are captured to be stored.

As shown in FIG. 3, the prescribed function (or specific function) is controlled by using a second touch consecutive to the first touch. Once the second touch is released, a capturing command is executed (S400). However, the present invention is not limited to this. For instance, capturing may be executed by input of a control command different from the release of the second touch.

For instance, if a subject is positioned, through zoom-in, on the preview region 251a with an area more than a prescribed value, the controller 180 may automatically store images output to the preview region 251a in the memory 160.

Also, the controller 180 may store images output to the preview region 251a in the memory 160, by recognizing a control command using a user's voice. For instance, if a voice command indicating 'capturing' is recognized by the controller 180, the controller 180 may store images output to the display unit 151.

While the prescribed function is activated, the capturing button 233 may be locked. That is, the control method may further comprise locking the capturing button (S300, refer to FIG. 3) for prevention of execution of a capturing command, the execution due to touch of the capturing button while the prescribed function is being executed.

Referring to FIGS. 4A and 4B, the controller 180 captures input images using a touch input to the capturing button. The controller 180 executes a function related to the camera mode, using a first touch defined to be different from the touch and input to the capturing button. And, the controller 180 locks the capturing button so that capturing can not be performed while the function is being executed.

More specifically, if a drag is performed in a direction opposite to a zoom-in drag, a zoom-out function is executed. If a zoom-in function and a zoom-out function are to change, the drag is performed through the capturing button 233. In this case, the controller 180 locks the capturing button 233, so that only a zoom function can be performed even if the user performs a drag through the capturing button 233.

In the mobile device and the control method thereof, executing a prescribed function and capturing images are performed by using a single finger. Further, since the capturing button is locked when the second touch is input, a control command can be input through the capturing button.

Hereinafter, the method for executing a prescribed function and capturing images will be explained in more detail.

FIGS. 5A to 5D are conceptual views showing activation of a prescribed function of a mobile device according to the present invention.

Figure 5A:
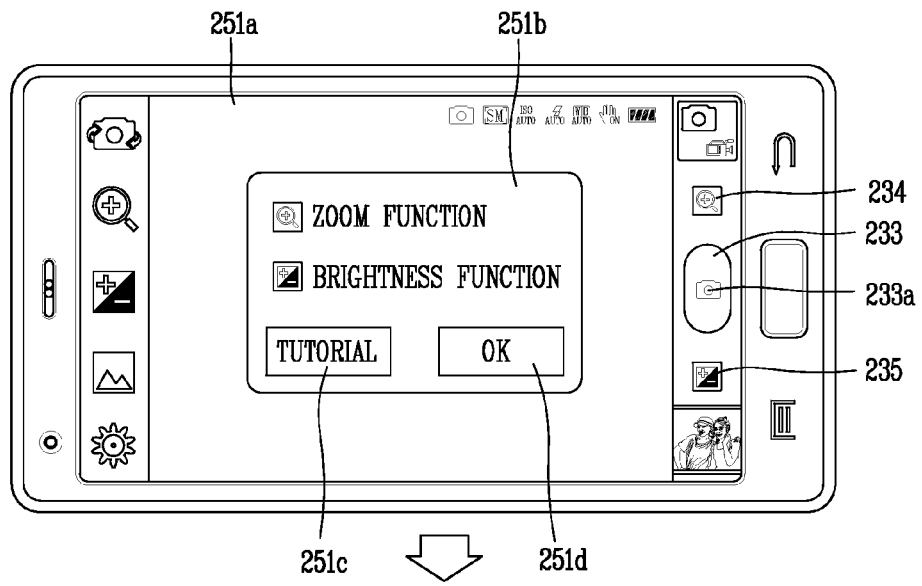
FIGS. 5A to 5D are conceptual views showing activation of a prescribed function of a mobile device according to the present invention.
Figure 5A:
Figure 5A:
Figure 5A:

Referring to FIG. 5A, once a camera mode is executed, an explanation window 251b for an additional function (prescribed function) may be output to a screen before a camera is activated. In this embodiment, the prescribed function may be a zoom function and a brightness control function. In this case, a tutorial button 251c for allowing a user to select a tutorial so as to practice a prescribed function, may be disposed on the explanation window 251b. In a case where capturing is performed when the capturing button is short-touched, the tutorial may serve to implement functions by other touch inputs.

Figure 5B:
Figure 5B:

Once the user selects an OK button 251d, images sensed by the camera are output to the preview region 251a. As shown in FIG. 5B, output of the explanation window 251 b may be omitted.

Referring to FIGS. 5A and 5B, different functions may be activated according to a direction of a first touch towards the capturing button.

Referring to FIG. 5A, if a drag is performed towards the capturing button from the upper end of the capturing button, a zoom function of the camera may be executed. Referring to FIG. 5B, if a drag is performed towards the capturing button from the lower end of the capturing button, a brightness control function may be executed.

In order to inform such functions to a user, a first icon 234 related to a zoom function and a drag direction, may be output to the upper end of the capturing button. Such icon may be implemented as a zoom image displayed in an arrow which is towards the capturing button 233. Likewise, a second icon 235 related to a brightness control function and a drag direction, may be output to the lower end of the capturing button 233. In this case, the first icon 234 and the second icon 235 may be dragged (moved) towards the capturing button 233 according to a user's drag input.

If a prescribed function is activated, at least part of the virtual button may change so that the prescribed function can be displayed. For instance, a camera image 233a is output into the capturing button 233, and the camera image changes into other image while the prescribed function is being activated.

More specifically, referring to FIG. 5A, if a drag is input from the upper end of the capturing button 233, a prescribed function may be activated, and the camera image 233a may change into a zoom image 233b. Here, the zoom image 233b may be a zoom image displayed on the first icon. The first and second icons may disappear from the screen while the prescribed function is being activated.

Referring to FIGS. 5A and 5B, a menu 242 indicating the current function may be activated on the opposite side to the capturing button based on the preview region 251a.

Figure 5C:
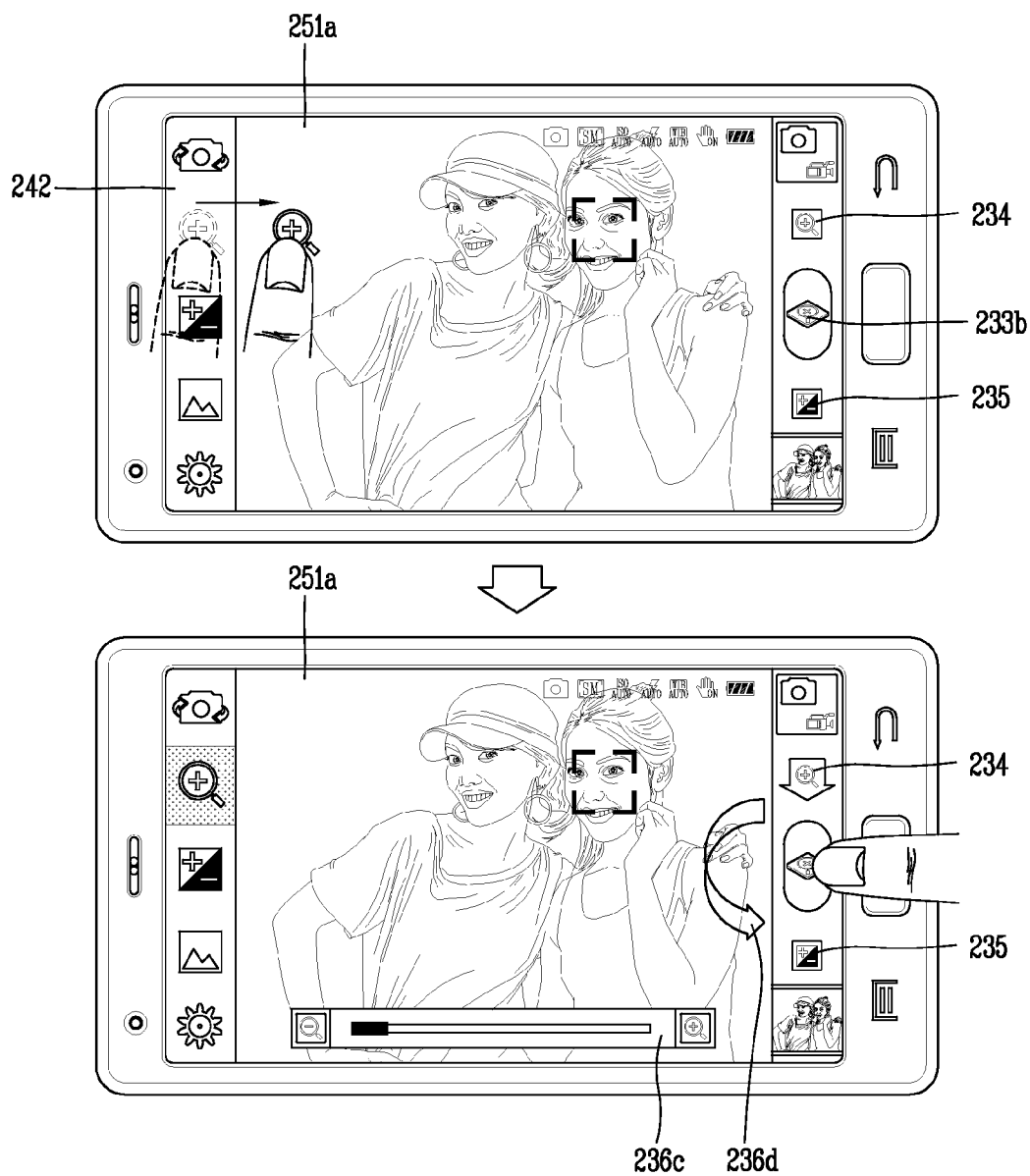

Referring to FIG. 5C, if the user touches a specific icon (e.g., brightness control) from the menu 242 rather than the first and second icons 234 and 235, and then drags the specific icon to the preview region 251a, a corresponding function may be performed.

Figure 5D:
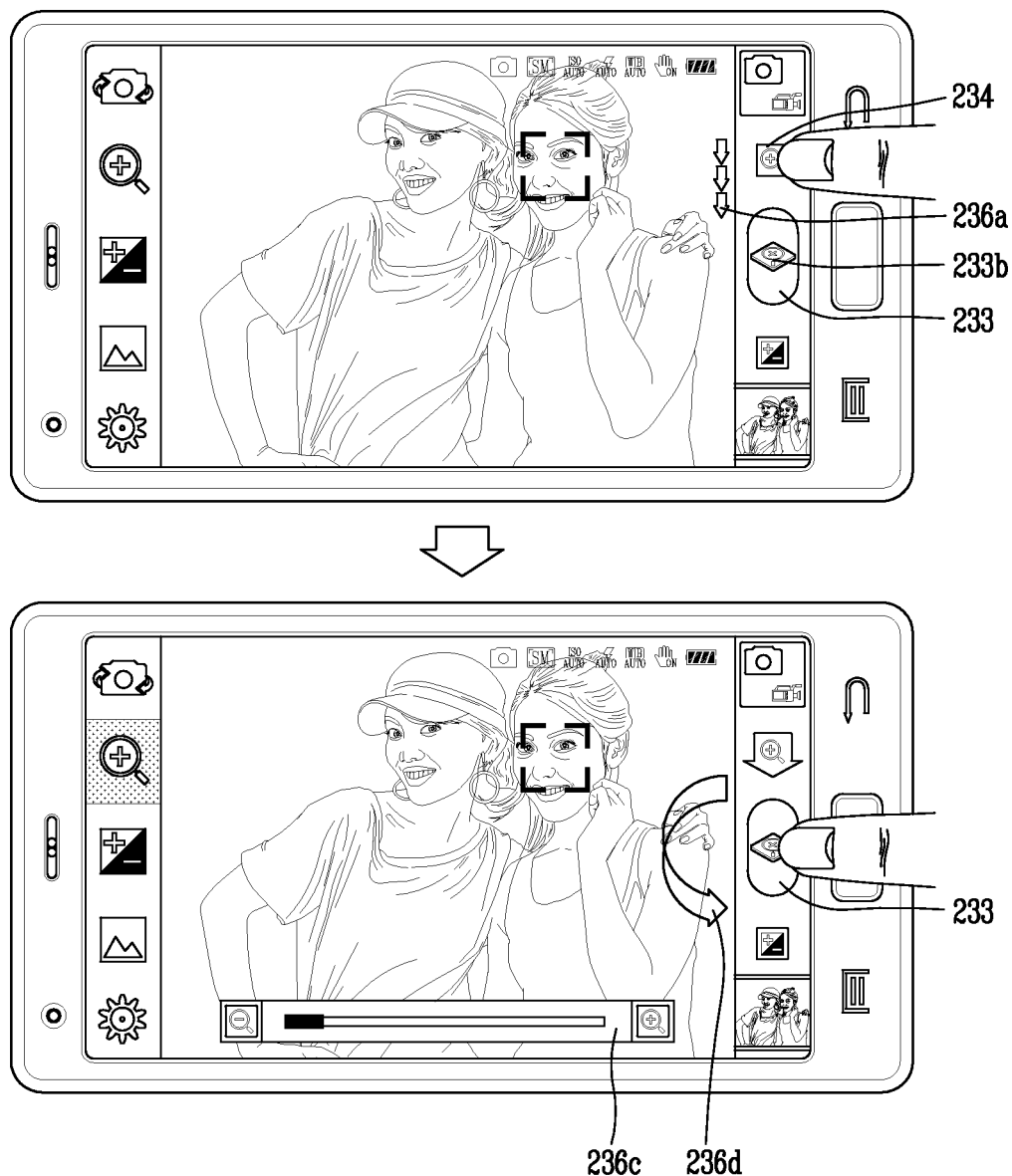

Referring to FIG. 5D, if the first icon 234 is touched, an animation 236a towards the lower side may be output, and the camera image of the capturing button 233 may change into the zoom image 233b. In this case, the zoom image 233b may be output in the form of a transparent or semi-transparent image.

If the user's finger downward moves, the zoom image 233b may change into an activated state, and an animation 236d indicating a zoom control direction may be output to the left side. And, a zoom seek bar 236c may be output to the preview region. The animation 236d may be implemented in the form of a rotation arrow, and a zoom function may be executed along the circumference of the rotation arrow.

The above icons may change according to a user's selection. Hereinafter, such modification examples will be explained.

Figure 6A:
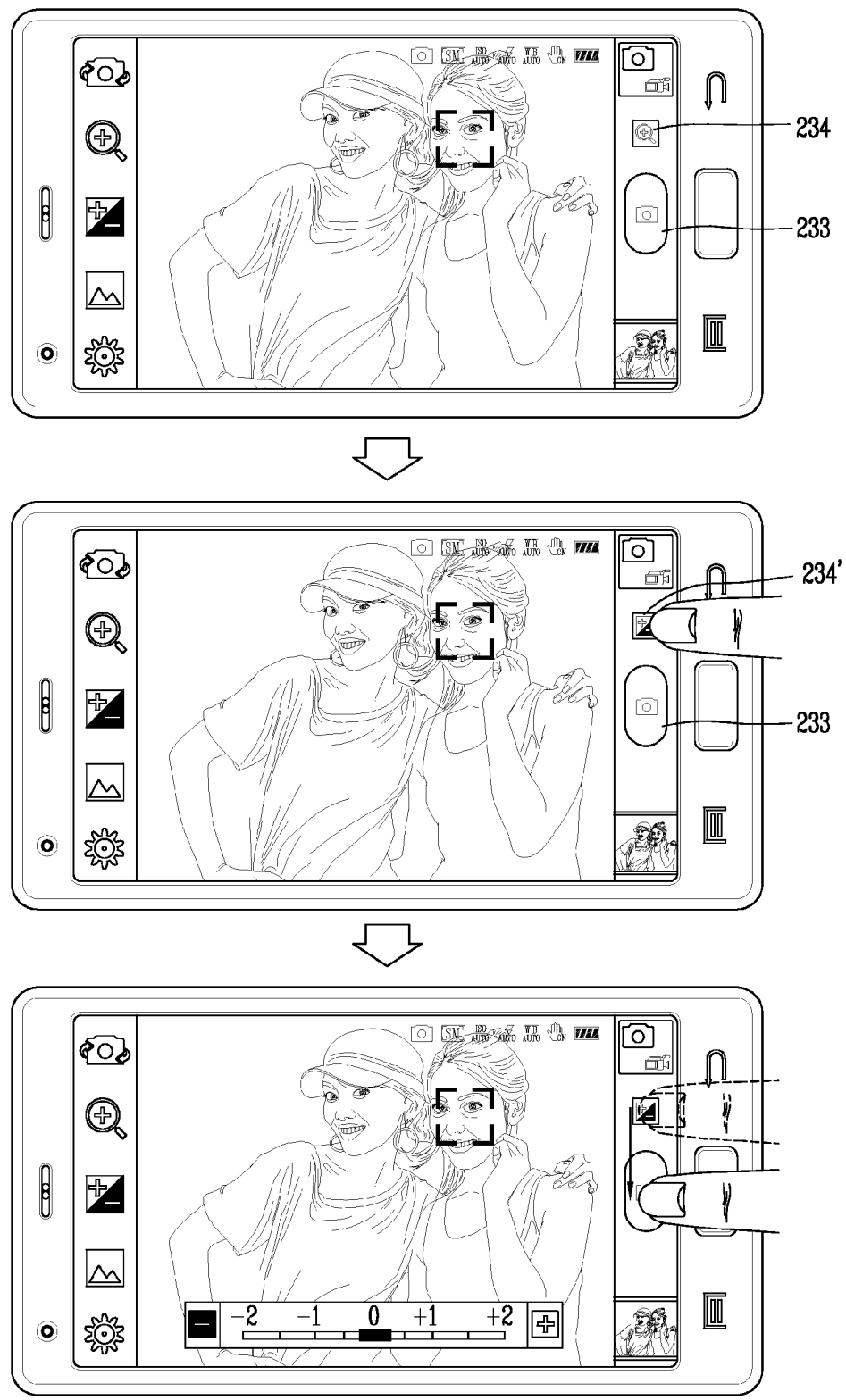
FIGS. 6A and 6B are conceptual views showing activation of a prescribed function of a mobile device according to the present invention.
Figure 6B:
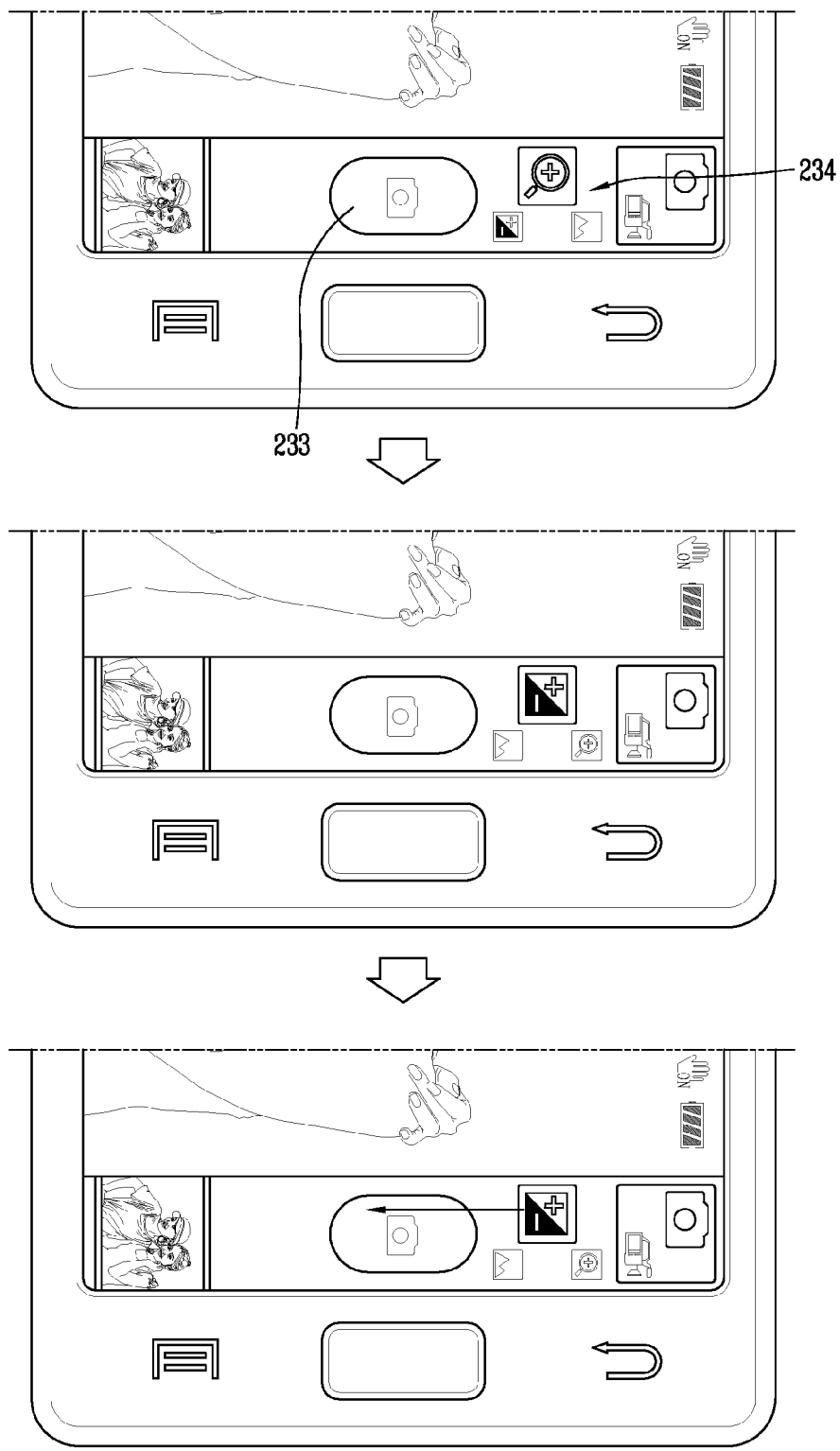

FIGS. 6A and 6B are conceptual views showing activation of a prescribed function of a mobile device according to the present invention.

Referring to FIG. 6A, in a camera mode, an icon 234 corresponding to a prescribed function is output to a position spaced from the capturing button 233. The prescribed function may be a zoom function, and the icon 234 may include a zoom image. Like in the aforementioned embodiment, once a user drags the icon 234 up to the capturing button 233, a zoom function is executed.

If the user touches (especially, short-touches) the icon 234, the prescribed function may change into other function. Alternatively, the icon 234 may change into an icon 234' corresponding to said other function. More specifically, if the user touches the icon, the prescribed function changes into a brightness control function. In this case, a brightness control image may be output to the inside of the icon 234'. If the user drags the icon 234' up to the capturing button 233, a brightness control function is executed.

As another example, as shown in FIG. 6B, images related to a plurality of functions may be output to the icon 234 spaced from the capturing button 233, in a camera mode. More specifically, different function icons are implemented in the form of menus. If one of the icons is touched to be released, the icons move closewise or counterclockwise so that the icon next to the touched icon can be positioned on the upper side. However, if one of the icons is touched to be dragged, the icons do not move. In this case, different function icons may be also disposed on the lower end in groups per category, like functions on the upper end.

Figure 7A:
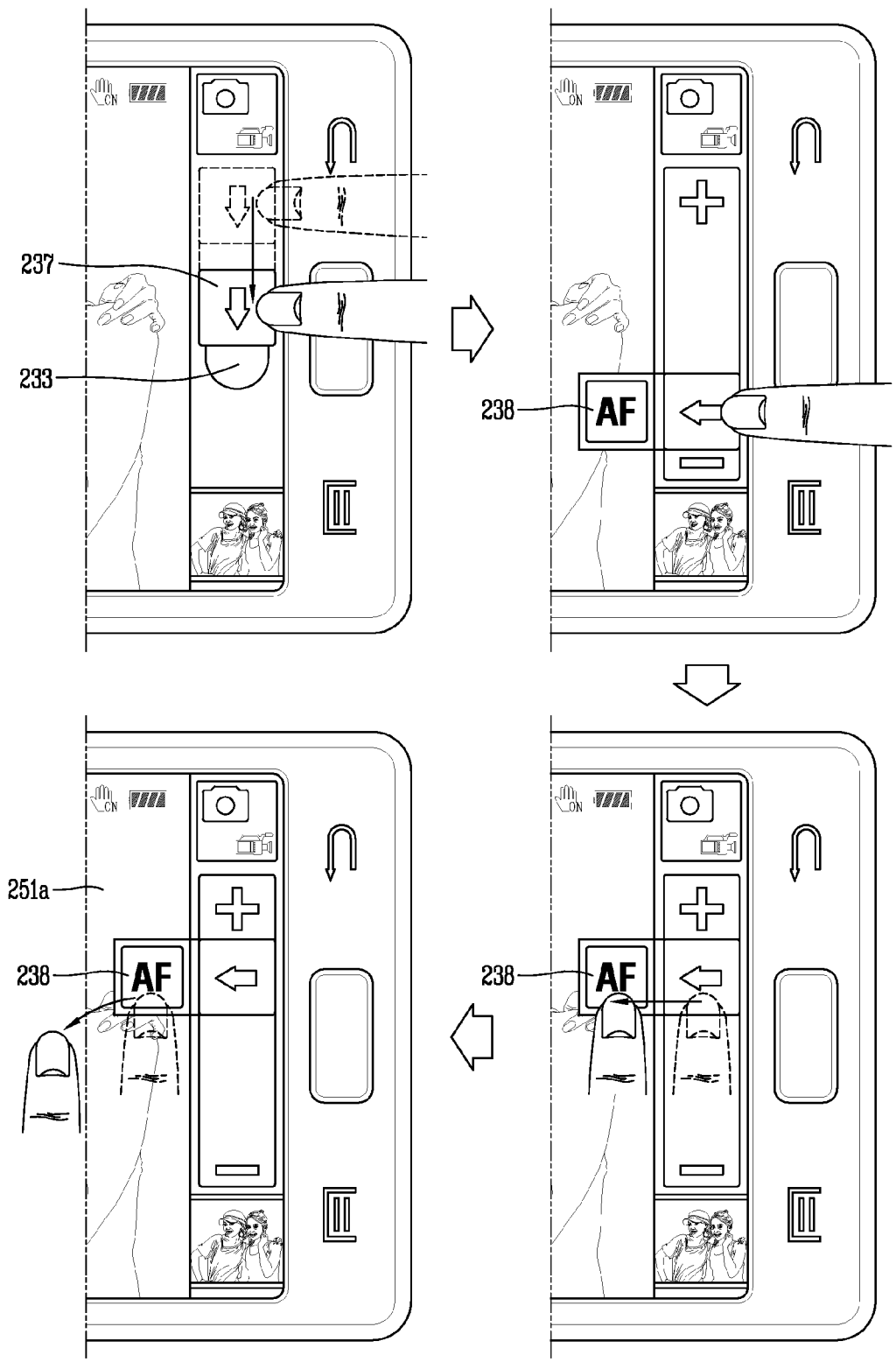
FIGS. 7A and 7B are conceptual views showing activating a prescribed function and capturing images in a mobile device according to the present invention.
Figure 7B:
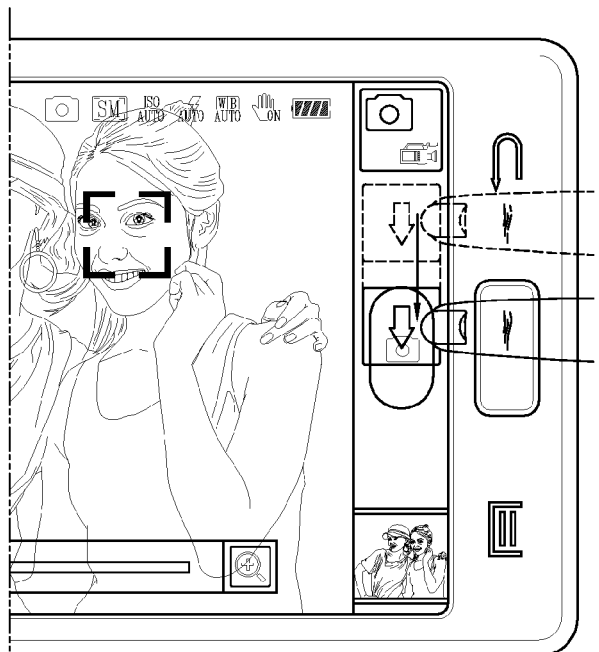
Figure 7B:
Figure 7B:
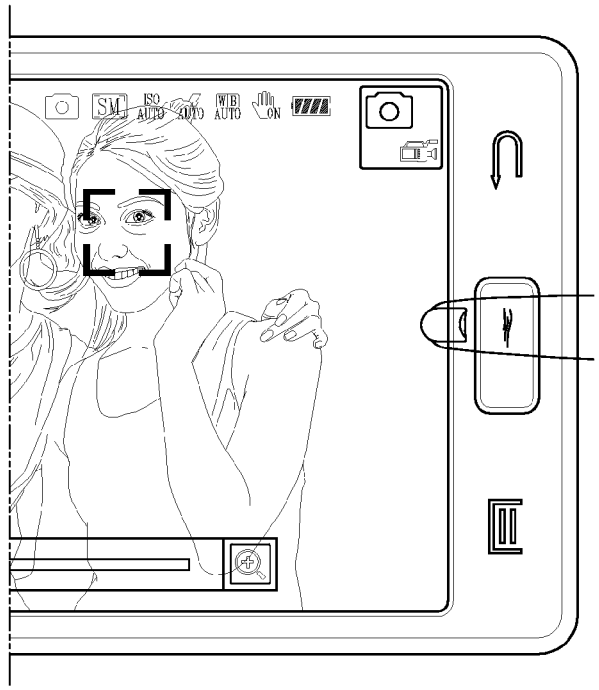

As another modification example, a graphic user interface (GUI) configured to guide a drag for activation of a prescribed function may be provided. Hereinafter, such GUI will be explained. FIGS. 7A and 7B are conceptual views showing activating a prescribed function and capturing images in a mobile device according to the present invention.

Referring to FIG. 7A, in a camera mode, a slide button 237 is output to at least one side of the capturing button. The slide button 237 may be moved by a user's drag. Once the slide button 237 is dragged towards the capturing button 233, a prescribed function is activated.

Hereinafter, will be explained a case where a prescribed function is a zoom function. As the zoom function is activated, a plus icon and a minus icon are generated at two sides of the capturing button. The control method of the present invention may further comprise generating a control range of a prescribed function at two sides based on the capturing button. Such plus icon and the minus icon may be implemented in the form of a slide bar, and the capturing button may disappear by the slide bar. In this state, if the slide button 237 is slid towards the plus icon, a zoom in function may be executed. On the other hand, if the slide button 237 is slid towards the minus icon, a zoom out function may be executed.

In this case, if the user's finger is detached from the display unit, i.e., the second touch is released, capturing may not be performed, but a zoomed state may be maintained. For instance, a focusing button 238 is generated for capturing, next to the slide button 237. If the user's finger touches the focusing button 238, a focusing function may be executed. On the other hand, if the user's finger is detached from the focusing button 238, a capturing function may be executed.

As another example, the second touch is a drag input within the control range, and a capturing command may be executed by a drag or a flicking input to a direction perpendicular to a drag direction of the second touch. More specifically, if a drag or a flicking is performed towards the preview region 251a after a zoom in/out function has been executed within the control range, capturing can be executed.

As another example, referring to FIG. 7B, a slide bar is output together with a capturing button in a camera mode. If the slide bar is dragged towards the capturing button, the prescribed function may be activated.

Once the prescribed function is activated, the slide bar may disappear so that the preview region can be enlarged on the display unit. In a state where the slide bar has disappeared, a zoom in/out function may be executed by a user's drag. Alternatively, once the prescribed function is activated, the capturing button may change to be transparent so that the preview region can be enlarged on the display unit. In some cases, the capturing button may change to be transparent, while the slide bar may disappear.

So far, it was explained about activation of a prescribed function. Hereinafter, will be explained a method for executing a prescribed function and capturing images.

FIGS. 8A to 8G are conceptual views showing performing a prescribed function and capturing images in a mobile device according to the present invention.

Figure 8A:
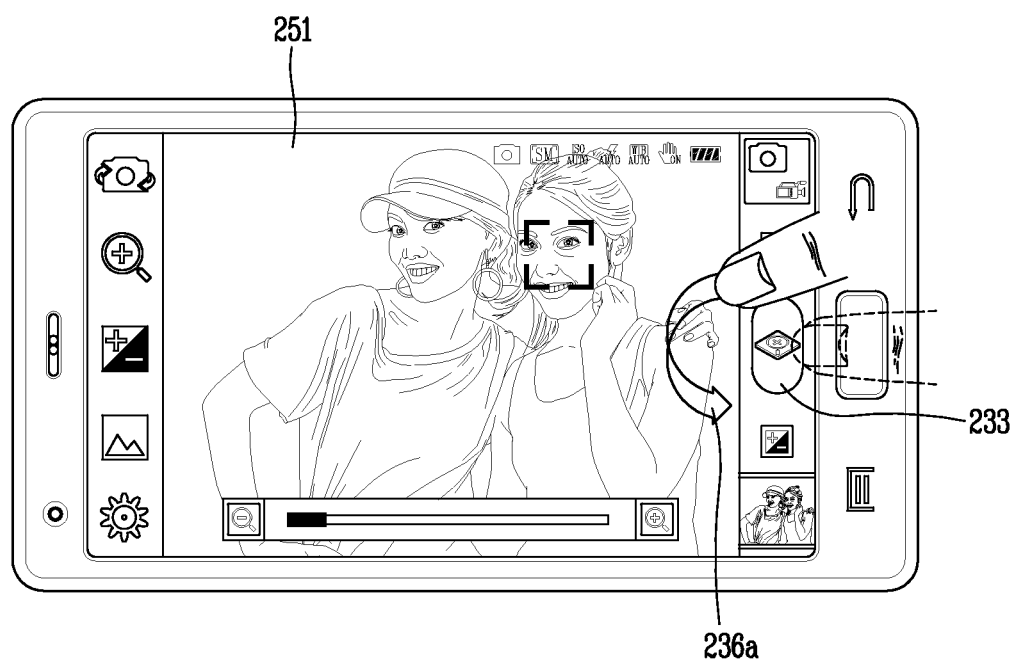
FIGS. 8A to 8G are conceptual views showing performing a prescribed function and capturing images in a mobile device according to the present invention.

Referring to FIG. 8A, in the aforementioned control method, the second touch may be a touch input which rotates around the capturing button 233 on one surface of the display unit 251 (refer to FIG. 2). The controller performs a prescribed function based on the degree of the rotation.

More specifically, the second touch is a drag which moves with a rotation track, starting from the capturing button. The prescribed function is controlled according to the length of the rotation track. If the drag is released from the end of the rotation track, the capturing command is executed.

For instance, as shown in FIG. 5C, an animation 236b is output to the left side of the capturing button in the form of a rotation arrow. The second touch may be a drag which moves along the rotation arrow.

Figure 8B:
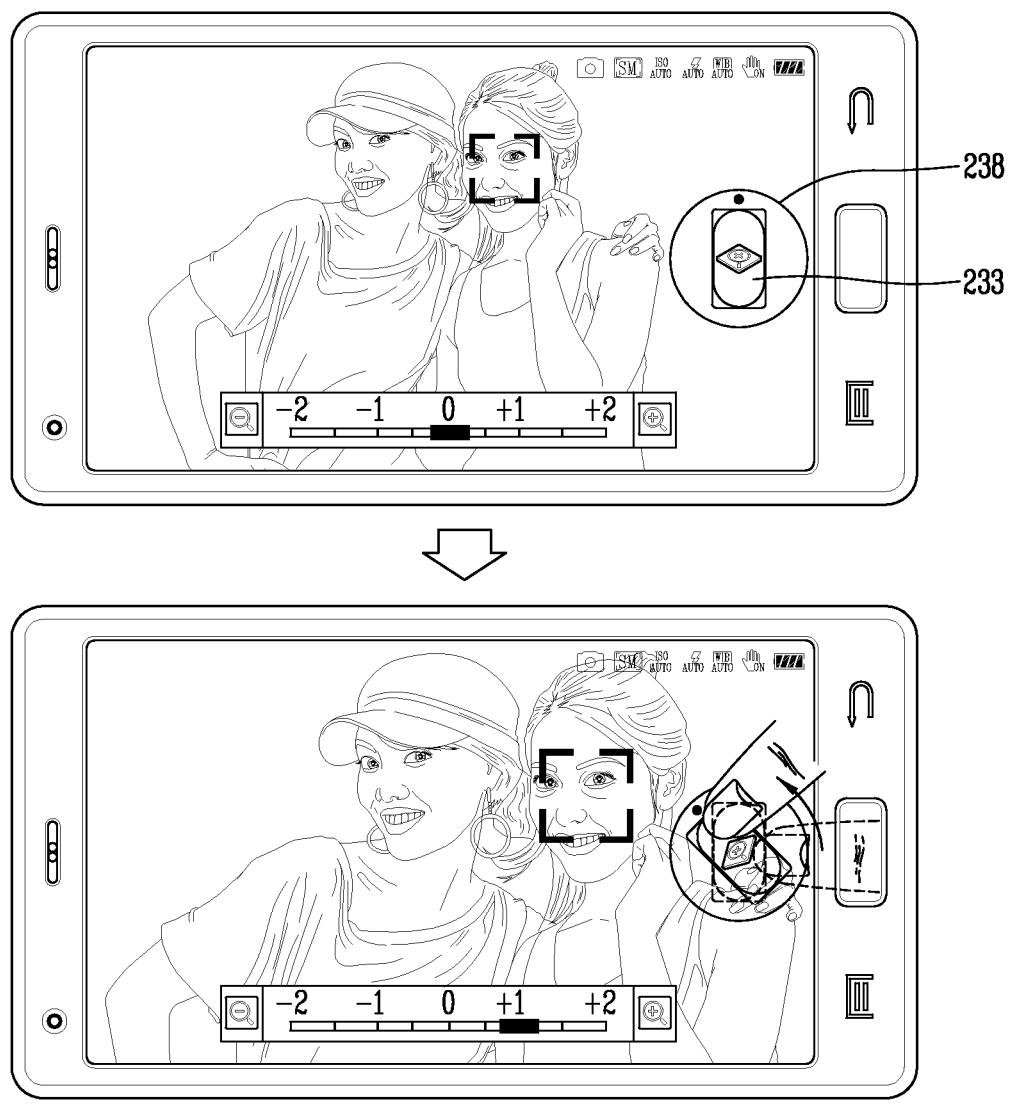

Referring to FIG. 8B, once a prescribed function is executed, a circular button 238 may be generated on the position of the capturing button 233. And, a prescribed function may be executed by a drag input along the circumference of the circular button 238. The prescribed function may be a zoom in/out function, or a brightness control function, etc. A state prior to execution of a prescribed function may be one of the aforementioned embodiments. Images indicating a prescribed function may be displayed only in the capturing button, but may disappear from other parts while the prescribed function is being executed. That is, in a case where slides or icons are positioned near the capturing button, the slides or icons may disappear.

The capturing button and the images are rotated by a drag. A zoom function or a brightness control function is executed, and a vibration occurs. Here, the degree of the vibration may be increased or decreased according to a control value (e.g., the degree of the vibration may be gradually increased when a zoom-in function is performed).

Figure 8C:

As another example, referring to FIG. 8C, a slide bar 239 may be generated in the circular button 238. As a user drags along the slide bar 239, a zoom in/out function or a brightness control function may be executed. The capturing button 233 may move along the slide bar 239 according to the user's drag. In this embodiment, the slide bar 239 is defined as a slide guide for guiding sliding of the capturing button 233.

The slide bar 239 may be a control range indicating a maximum value and a minimum value of a set value with respect to a prescribed function. If the user detaches his or her finger from the capturing button 233 after performing a zoom in-out function or a brightness control function, capturing may be performed.

Figure 8D:
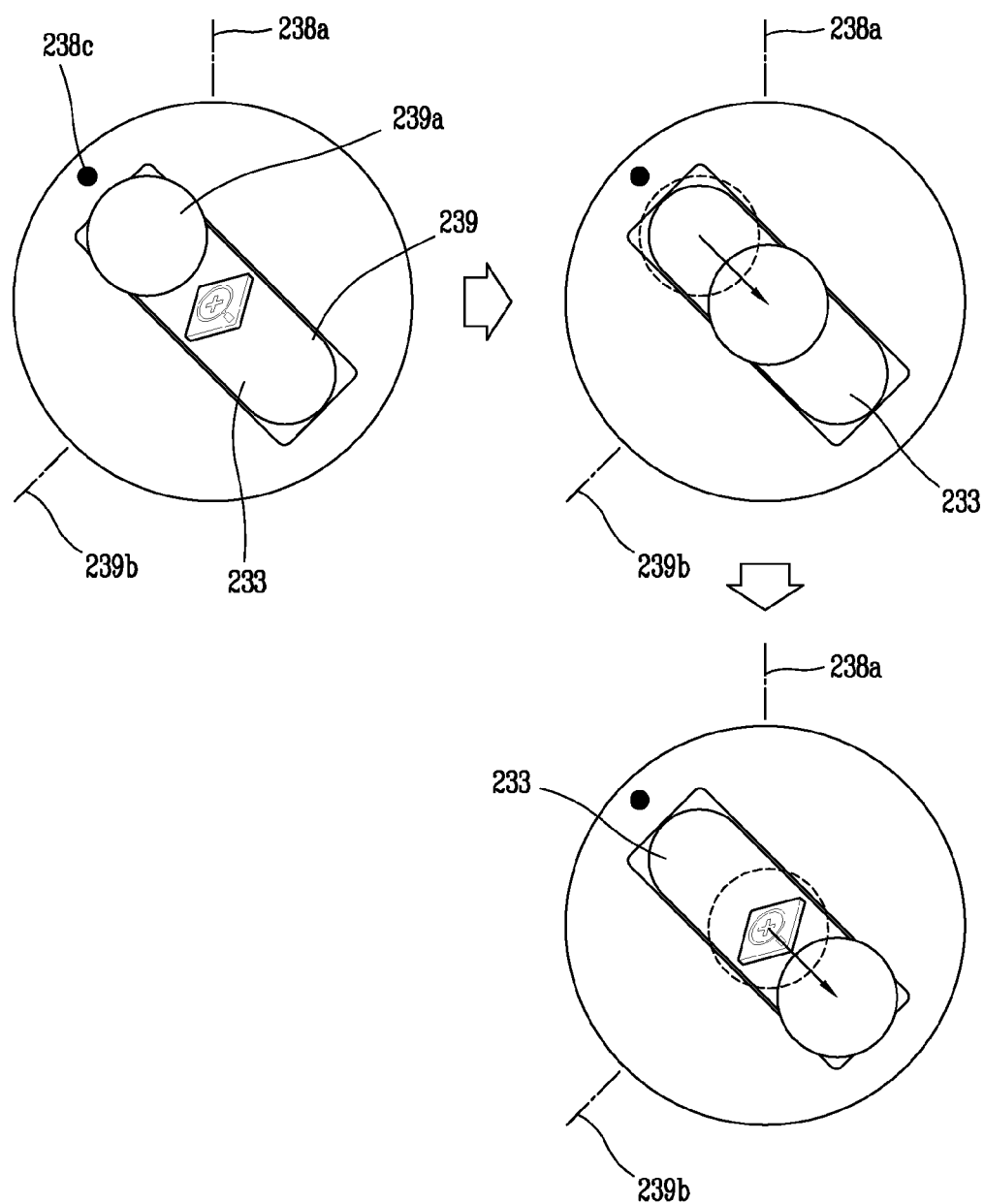

As another example, referring to FIG. 8D, the slide bar and the circular button may be set to implement a single touch input by being combined with each other.

Boundary gradations 238a and 239b indicating a maximum value and a minimum value of a control range are displayed on the circular button 238. A pointer 238c indicating the current control position is output onto the circumference of the circular button 238. As the user drags along the circumference of the circular button 238, the pointer 238c and the slide bar 239 are rotated in connection thereto. A pointer button 239a for setting a capturing mode may be output into the slide bar 239, and a capturing mode may be set according to the position of the pointer button 239a inside the slide bar 239. For instance, if the pointer button 239a is disposed at two ends of the slide bar 239, a function control mode and a consecutive capturing mode may be executed. That is, if the user drags the pointer button 239a in the slide bar 239, the pointer button 239a is dragged. And, if the user's finger is detached from the lower end of the slide bar 239, consecutive capturing is executed. If the pointer button 239a is positioned on the capturing button, a general capturing mode is executed. In this state, if the user's finger is detached from the pointer button 239a, general capturing is executed.

The circular button 238 may be implemented in a different form, according to the current capturing mode. For instance, in a function control mode for controlling a prescribed function, the circular button 238 may have a transparent white color. In a general capturing mode, the circular button 238 may have a transparent green color. And, in a consecutive capturing mode, the circular button 238 may have a transparent blue color.

If the user's finger is detached from the display unit, the current screen may return to the initial screen. In this case, a controlled value may be stored. Under such configuration, a brightness control function, a zoom control function, a menu control function, etc. may be consecutively performed.

Figure 8E:
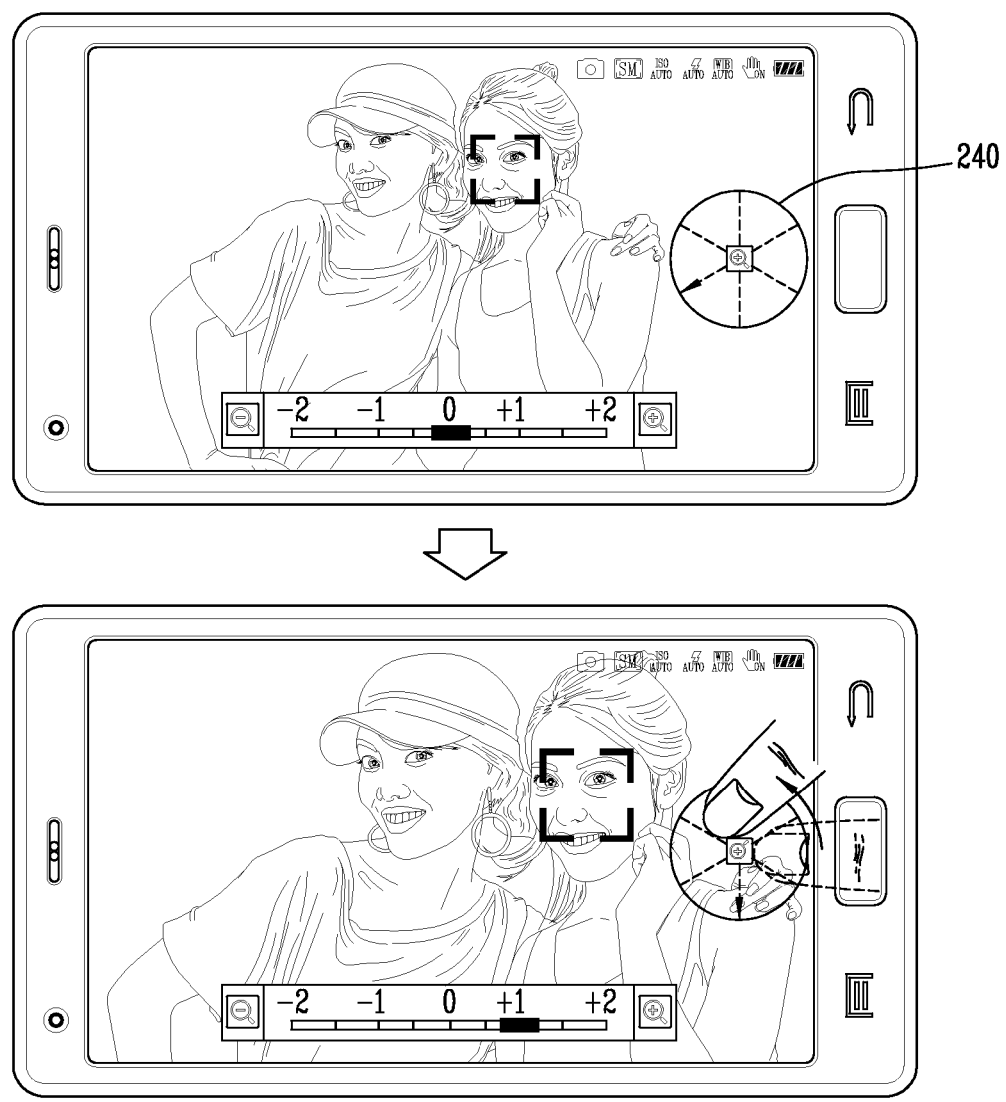

As another example, referring to FIG. 8E, once a prescribed function is executed, a jog wheel 240 is generated on the position of the capturing button. If the jog wheel 240 is rotated by the user's touch input for rotating the jog wheel 240, values of a prescribed function may be controlled. In this case, an indicator indicating a type of the current mode may be displayed on the jog wheel 240. For instance, an icon indicating the prescribed function is contracted to be displayed in the jog wheel 240. Also, a controlled degree of the current mode may be displayed. To this end, gradations may be output along the circumference of the jog wheel. In this case, may be implemented a GUI for allowing other icons rather than the jog wheel to disappear so that a preview function cannot be interfered.

A vibration feedback may be implemented in connection with rotation of the jog wheel 240. This can provide a user with feeling that he or she actually rotates the jog wheel. The intensity of the vibration may be increased or decreased by some degrees from a minimum value to a maximum value. For instance, in case of zoom-in, the intensity of the vibration may be gradually increased. On the other hand, in case of zoom-out, the intensity of the vibration may be gradually decreased.

Figure 8F:
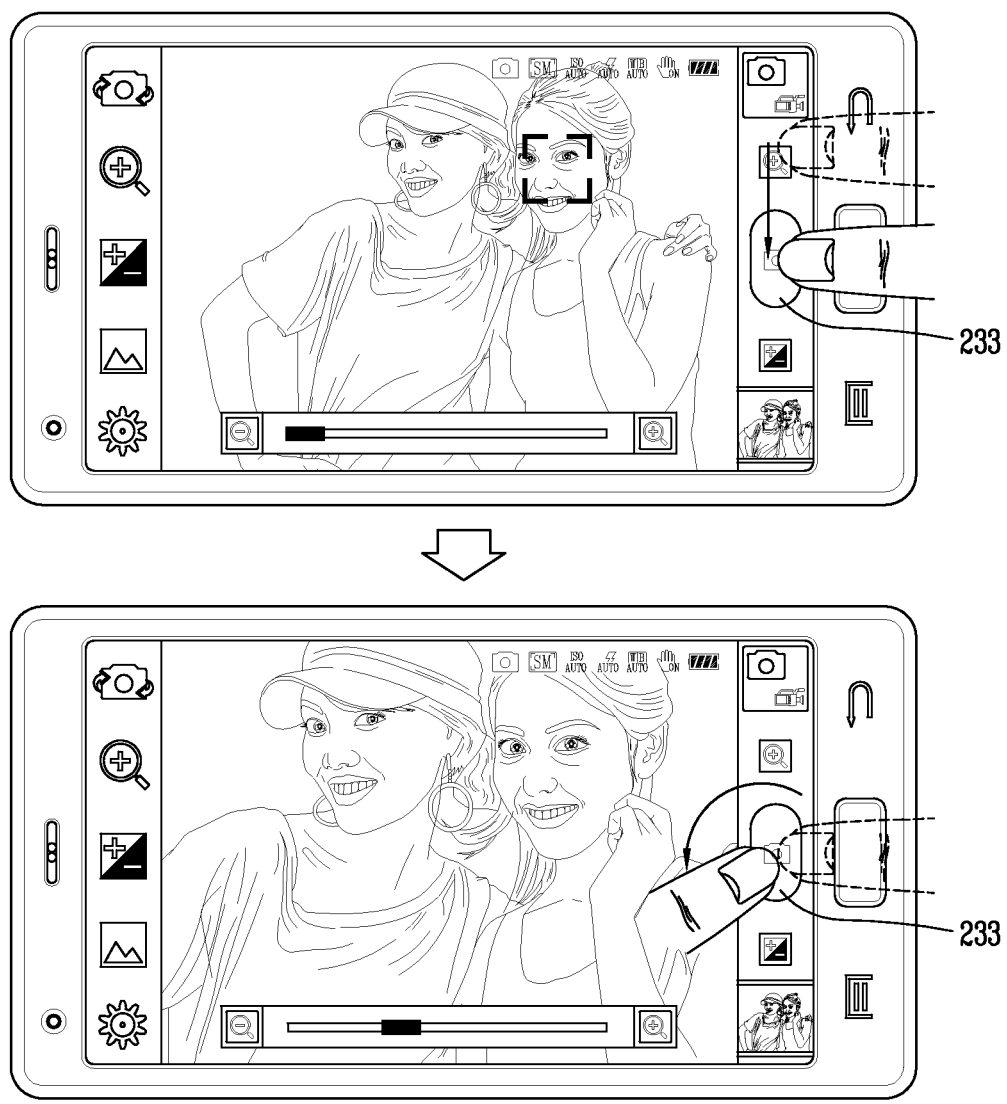

As another example, referring to FIG. 8F, the second touch may be a rotation touch which rotates at the same spot around the capturing button 233. The prescribed function may be controlled according to a rotation angle of the rotation touch.

More specifically, once the user's finger is rotated around a point inside the capturing button 233, a zoom in/out function, or a brightness control function, etc. are controlled. If the user's finger is detached from the display unit after a prescribed function has been performed, capturing is executed. However, if the user's finger is detached from the display unit after moving to the upper side or the lower side of the capturing button, only a prescribed function is performed while capturing is not performed.

Figure 8G:
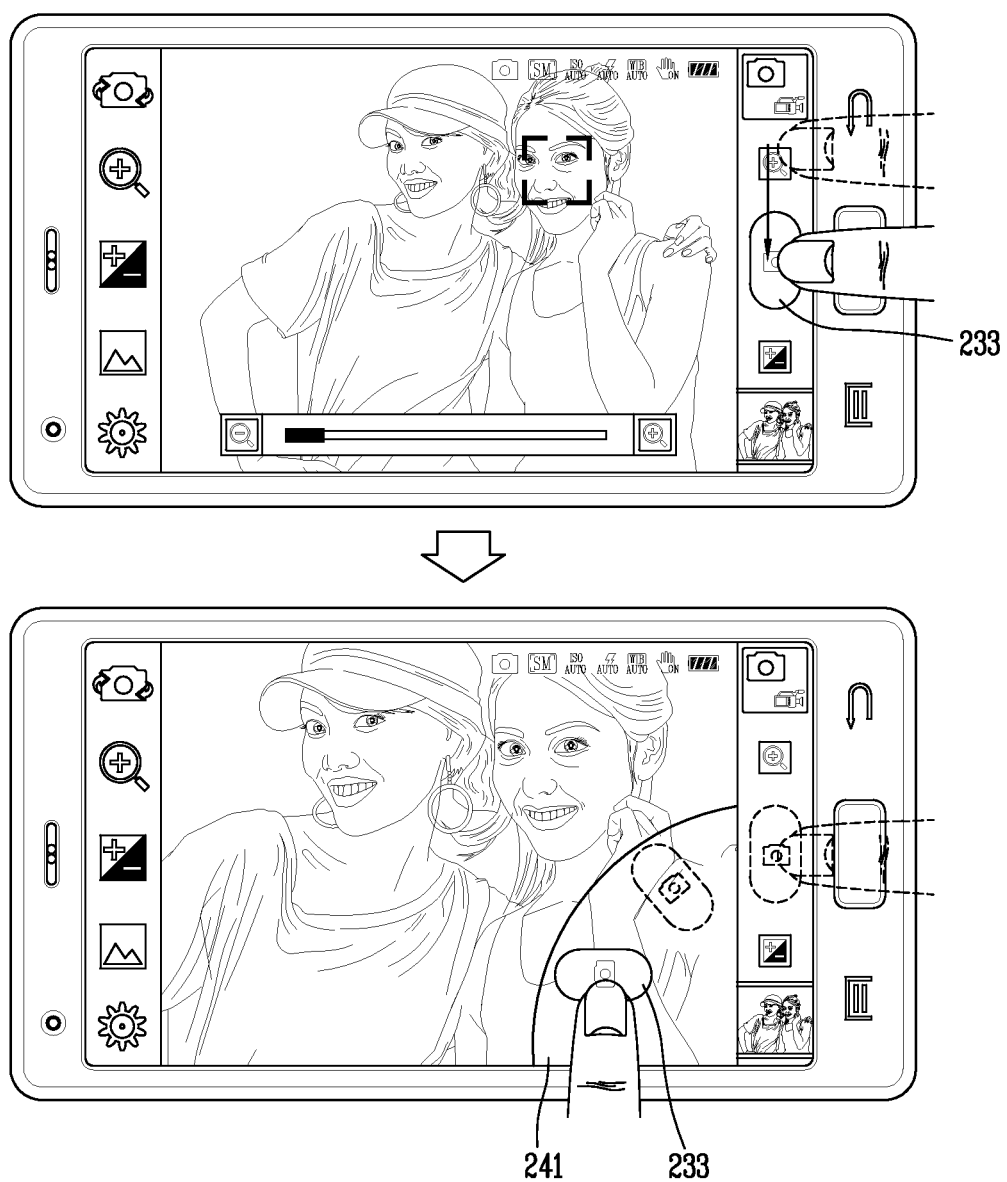

As another example, referring to FIG. 8G, if the user's finger is downward moved towards the capturing button 233, a prescribed function is executed and a semi-circular image 241 is pop-up. The image 241 may be transparent so that part thereof overlapping a preview image can be exposed to the outside.

The prescribed function may be executed by a drag performed along the outside of the image 241. For instance, if the user's finger is pushed along the outer circumference of the semi-circular image 241, starting from the capturing button 233, a zoom-in function may be executed. On the other hand, if the user's finger is pulled along the outer circumference of the semi-circular image 241, a zoom-out function may be executed. If the user's finger is immediately detached from the display unit after zoom control, capturing is performed. However, if the user's finger is detached from the display unit, after being moved towards the inside of the semi-circular image 241 after zoom control, only zoom control is performed, while capturing is not performed. More specifically, if the user drags towards the center of the semi-circular image after zoom control by a drag along the circumference of the semi-circular image 241, the zoom control is completed. If the user touches the capturing button again, capturing may be performed.

The aforementioned embodiments of FIGS. 8A to 8G are not limited to the aforementioned explanations, but may combine with each other. Further, the present invention may implement an embodiment where the current screen returns to the initial preview screen prior to execution of a prescribed function, if the user's finger is detached from the display unit when controlling the prescribed function.

Figure 9:
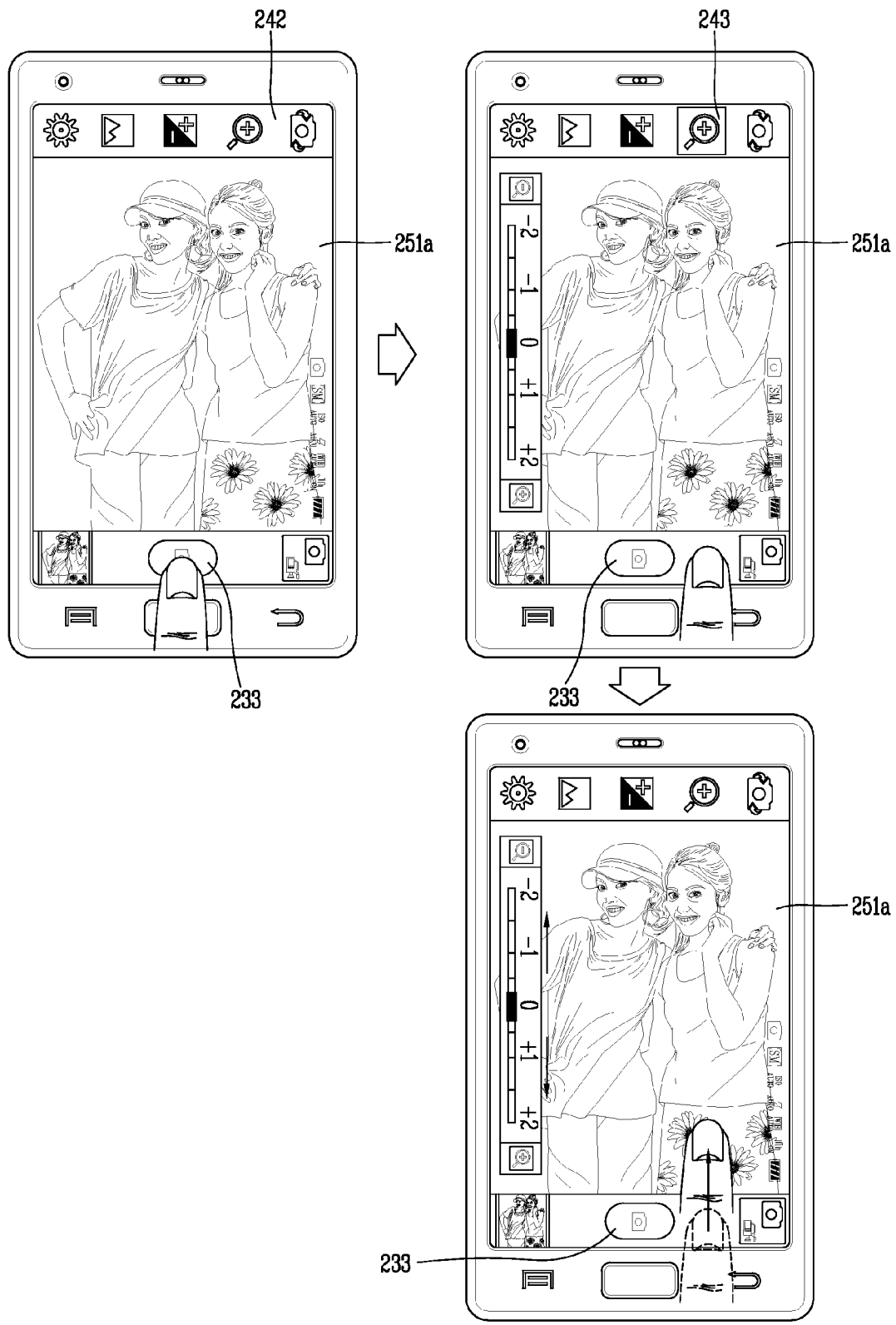
FIG. 9 is a conceptual view showing activating a prescribed function and capturing images in a mobile device according to an embodiment of the present invention.

As another example of the aforementioned user interface, different functions may be performed according to a direction of a second touch, which will be explained hereinafter. FIG. 9 is a conceptual view showing activating a prescribed function and capturing images in a mobile device according to an embodiment of the present invention.

Referring to FIG. 9, the second touch includes a first drag input to one direction starting from a capturing button, and a second drag input to another direction perpendicular to said one direction. The first and second drags are configured to control different functions.

More specifically, the first drag may be configured to control a menu selection function, and the second drag may be configured to control a function of a menu selected by the first drag.

For instance, if the user long-touches the capturing button 233, an upper menu 242 enters an activation mode. In this state, if the user continuously touches the capturing button 233 without moving his or her finger, consecutive capturing is performed. However, if the user's finger is moved right and left in a state where the upper menu has been activated (i.e., first drag), a cursor 243 moves on the upper menu. This can allow the user to conveniently set a menu without touching the upper menu.

After selecting a prescribed function from the upper menu, the user controls the selected prescribed function using a second drag. In a case where a menu indicated by the cursor 243 has a zoom function, if the user drags towards the preview region 251a (second drag), a zoom in/out function is performed. If the user's finger is detached from the preview region 251a in a state where zoon control has been performed, capturing may be executed.

The present invention provides user interfaces using a locked state of a capturing button. Hereinafter, such user interfaces will be explained in more detail.

Figure 10A:
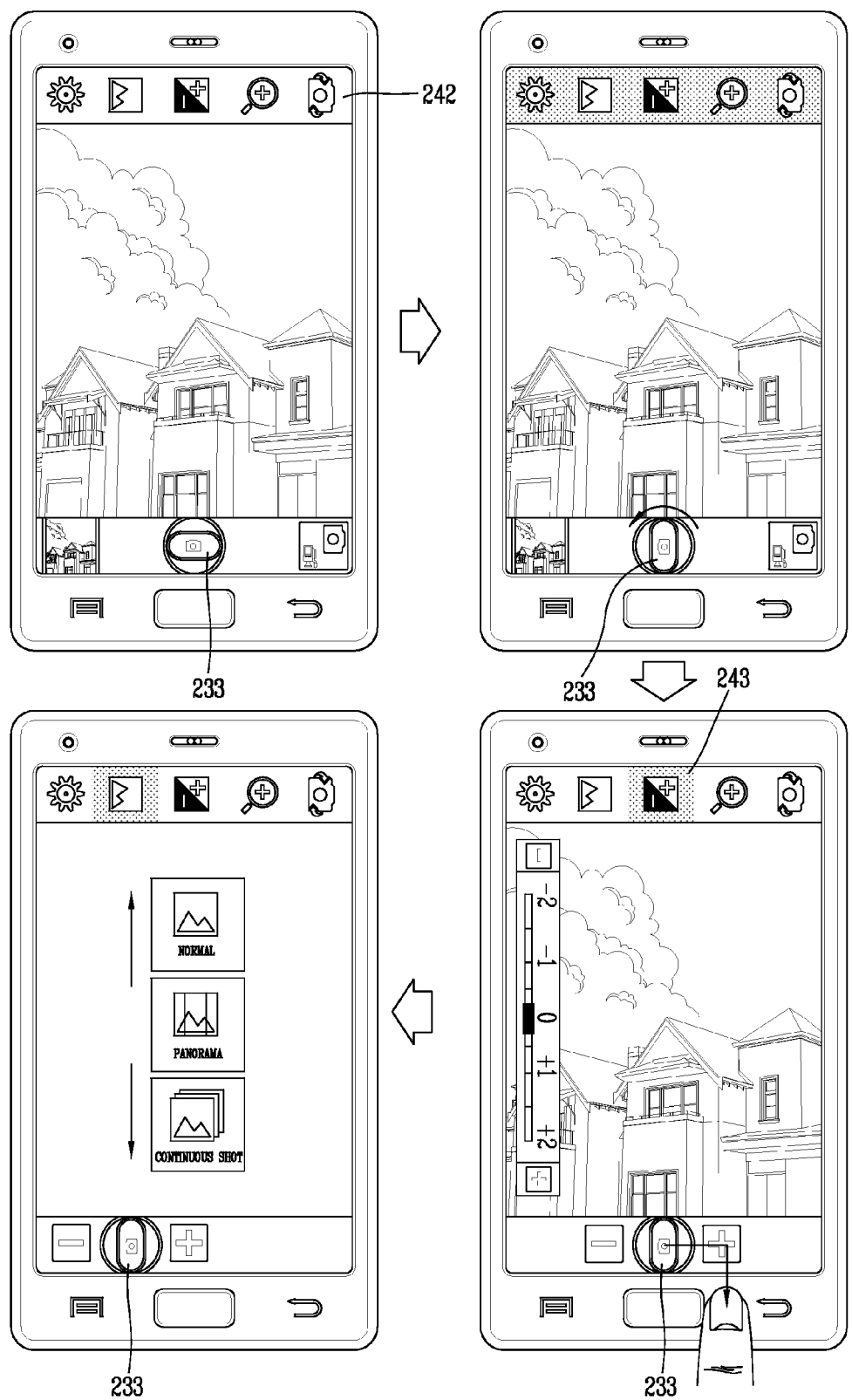
FIGS. 10A and 10B are conceptual views showing an embodiment where a locked state of a capturing button is utilized in a mobile device according to an embodiment of the present invention.
Figure 10B:
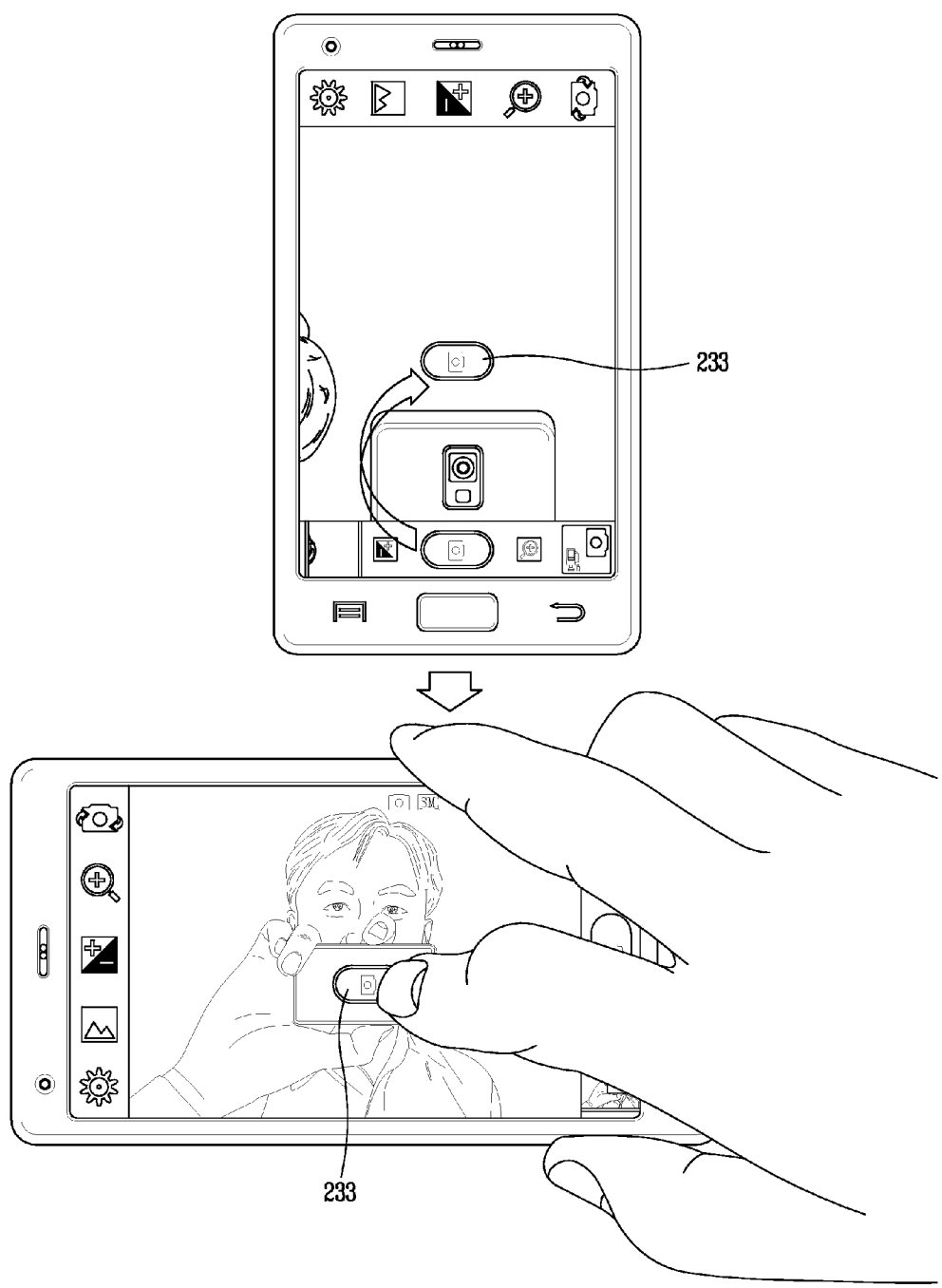

FIGS. 10A and 10B are conceptual views showing an embodiment where a locked state of a capturing button is utilized in a mobile device according to an embodiment of the present invention.

Referring to FIG. 10A, the capturing button 233 may be rotated to be erected by a user. For instance, if the user's finger is rotated at the same spot after touching the capturing button 233, the capturing button 233 is rotated by 90° to be locked so that execution of a capturing command can be prevented. A control range is generated at the lower end of the mobile device, and the upper menu enters an activation mode.

Even if the user touches the capturing button 233 or the user's finger is detached from the capturing button 233, capturing is not performed. If the user's finger moves right and left in a state where the upper menu 242 is activated, a cursor 243 moves from the upper menu. As the cursor 243 moves, the capturing button 233 may also move. If the user's finger is detached from a desired menu, the desired menu is selected. A prescribed function may be controlled by a drag within a control range, or a rotation on or around the capturing button, etc.

After one function has been set, another function may be set by moving the capturing button 233. As shown, if the capturing button 233 is moved to a position corresponding to a capturing mode setting function from a position corresponding to a brightness control function, a capturing mode setting function is executed. Here, the capturing mode setting function may be a function to set one of a plurality of capturing modes including general capturing, consecutive capturing, panorama, face recognition, etc. If there are sub menus, the sub menus may be output to a preview region so that the sub menus can be selected from the preview region.

Finally, if the capturing button 233 is rotated to the initial position, the mobile device enters the initial state where capturing can be performed. In a state where setting has been completed, a user may press the capturing button 233 to capture images.

Referring to FIG. 10B, may be implemented a user interface for moving the capturing button 233 by a second touch different from a first touch for activating a prescribed function. For instance, the first touch may be a long touch input to the capturing button 233, and the second touch may be a drag for moving the capturing button 233.

In case of self capturing, a user has inconvenience in manipulating the capturing button 233, because the user unstably holds the mobile device with his arm extended to the maximum. If the user inputs a long touch to the capturing button to thus drag the capturing button 233 to a desired position, the capturing button 233 is moved. This can allow the user's finger to be conveniently moved. In this case, if the user's finger is detached from the capturing button (i.e., if the second touch is released) after the capturing button 233 is moved, capturing may be performed.

However, the present invention is not limited to this. If the user detaches his finger from the capturing button 233 after moving the capturing button 233, capturing may not be performed while the capturing button 233 may change to be transparent. If the capturing button 233 changes to be transparent, can be prevented interference of images output to a preview region. In this case, if the user touches a capturing button moved to a desired position, capturing may be performed. This can allow self capturing to be more conveniently performed.

In the mobile device and the control method of the present invention, consecutive inputs are implemented as a first touch and a second touch. This can allow capturing to be consecutively performed after a prescribed function is executed.

Further, since the first touch and the second touch are sensed based on the capturing button 233, a prescribed function and capturing can be performed by a user's single finger. This can allow a user to more conveniently input a control command in a camera mode.

Besides, since the capturing button 233 is locked when the second touch is performed, more control commands can be input within a limited region. And, self capturing can be more easily performed by moving the locked capturing button.

In the mobile device and the control method of the present invention, the size and the position of a subject can be provided from a user while capturing is performed. This can allow the subject to be captured within a desired range.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a mobile device, the method comprising:
    displaying, on a touchscreen, a preview image of an image obtained via a camera;
    displaying, on the touchscreen, an image capture icon;
    applying a zoom function to the displayed preview image when a drag input is received at the touchscreen in a first direction, wherein the applying of the zoom function occurs while the drag input is received in the first direction, and wherein the drag input in the first direction begins at a point that is located at a distance from the image capture icon;
    changing a displayed characteristic of the displayed preview image according to a second function when the drag input is received at the touchscreen in a second direction that is opposite to the first direction, wherein the second function is different than the zoom function, wherein the changing of the displayed characteristic occurs while the drag input is received in the second direction, wherein the drag input in the second direction begins at a point that is located at a distance from the image capture icon, and wherein the drag input in the first and second directions extends over at least a portion of the displayed image capture icon;
    storing in non-volatile memory an image associated with the displayed preview image in response to a release of the drag input in either of the first direction or the second direction.

2. The method of claim 1, wherein the drag input in the first direction and the second direction is towards the displayed image capture icon.

3. The method of claim 2, wherein the second function comprises at least a brightness control function, or a menu selection function.

4. The method of claim 1, further comprising displaying a first icon on the touchscreen, the first icon corresponding to the second function.

5. The method of claim 4, further comprising changing the second function to a third function when a touch to the first icon is detected.

6. The method of claim 5, further comprising changing the first icon to a second icon corresponding to the third function when the second function is changed to the third function.

7. The method of claim 1, further comprising:
    displaying a slide bar on the touchscreen, the slide bar spaced from the displayed image capture icon; and
    receiving a touch input to activate the zoom function when the slide bar is dragged towards the image capture icon.

8. The method of claim 1, wherein the applying the zoom function comprises terminating the displaying of the image capture icon such that a preview region on the touchscreen is enlarged.

9. The method of claim 1, further comprising:
    displaying a camera image in the image capture icon; and changing the camera image into another image while applying the zoom function.

10. The method of claim 1, wherein the drag input in the first and second direction occurs over an area that extends about the image capture icon, the method further comprising:
changing an amount of the zoom function applied to the displayed preview image according to an amount of the drag input.

11. The method of claim 1, wherein the drag input in the first and second direction occurs over an area that extends about the image capture icon, the method further comprising:
changing an amount of the zoom function applied to the displayed preview image according to an angle of rotation of the drag input.

12. The method of claim 1, further comprising displaying a control range of the zoom function, the control range displayed on at least two sides of the displayed image capture icon.

13. The method of claim 1, further comprising locking the displayed image capture icon such that storing of the image associated with the preview image is prevented while the zoom function is being applied.

14. The method of claim 1, wherein prior to receiving the drag input, the method further comprises:
storing the image associated with the preview image in response to a touch input received at a displayed location of the image capture icon.

15. The method of claim 1, further comprising:
maintaining the displaying of the image capture icon at a same location of the touchscreen during the receiving of the drag input in either of the first direction or the second direction.

16. The method of claim 1, wherein the storing in non-volatile memory is in response to a release of the drag input in either of the first direction or the second direction that occurs at a distance from the image capture icon.

17. A mobile device, comprising:
a camera;
a touchscreen;
a non-volatile memory;
a controller configured to:
cause the touchscreen to display a preview image of an image obtained via the camera;
cause the touchscreen to display an image capture icon;
apply a zoom function to the displayed preview image when a drag input is received at the touchscreen in a first direction, wherein the applying of the zoom function occurs while the drag input is received in the first direction, and wherein the drag input in the first direction begins at a point that is located at a distance from the image capture icon;
change displayed characteristic of the displayed preview image according to a second function when the drag input is received at the touchscreen in a second direction that is opposite to the first direction, wherein the second function is different than the zoom function, wherein the changing of the displayed characteristic occurs while the drag input is received in the second direction, wherein the drag input in the second direction begins at a point that is located at a distance from the image capture icon, and wherein the drag input in the first and second directions extends over at least a portion of the displayed image capture icon; and
store in the non-volatile memory an image associated with the displayed preview image in response to a release of the drag input in either of the first direction or the second direction.

18. The mobile device of claim 17, wherein the drag input in the first direction and the second direction is towards the displayed image capture icon.

19. The mobile device of claim 18, wherein the second function comprises at least a brightness control function, or a menu selection function.

20. The mobile device of claim 17, wherein the controller is further configured to:
cause the touchscreen to display a first icon, the first icon corresponding to the second function.

21. The mobile device of claim 20, wherein the controller is further configured to:
change the second function to a third function when a touch to the first icon is detected.

22. The mobile device of claim 21, wherein the controller is further configured to:
change the first icon to a second icon corresponding to the third function when the second function is changed to the third function.

23. The mobile device of claim 17, wherein the controller is further configured to:
cause the touchscreen to display a slide bar, the slide bar spaced from the displayed image capture icon; and
receiving a touch input to activate the zoom function when the slide bar is dragged towards the image capture icon.

24. The mobile device of claim 17, wherein the applying the zoom function comprises terminating the displaying of the image capture icon such that a preview region on the touchscreen is enlarged.

25. The mobile device of claim 24, wherein the controller is further configured to:
cause the touchscreen to display a camera image in the image capture icon; and
change the camera image into another image applying the zoom function.

26. The mobile device of claim 17, wherein the drag input in the first and second direction occurs over an area that extends about the image capture icon, and wherein the controller is further configured to:
change an amount of the zoom function applied to the displayed preview image according to amount of the drag input.

27. The mobile device of claim 17, wherein the drag input in the first and second direction occurs over an area that extends about the image capture icon, and wherein the controller is further configured to:
change an amount of the zoom function applied to the displayed preview image according to an angle of rotation of the drag input.

28. The mobile device of claim 17, wherein the controller is further configured to:
cause the touchscreen to display a control range of the zoom function, the control range displayed on at least two sides of the displayed image capture icon.

29. The mobile device of claim 17, wherein the controller is further configured to:
lock the displayed image capture icon such that storing of the image associated with the preview image is prevented while the zoom function is being applied.

30. The mobile device of claim 17, wherein prior to receiving the drag input, the controller is further configured to:
store the image associated with the preview image in response to a touch input received at a displayed location of the image capture icon.

* * * * *